US012585715B2

(12) United States Patent
Srivastava et al.

(10) Patent No.: US 12,585,715 B2
(45) Date of Patent: Mar. 24, 2026

(54) SYSTEMS AND METHODS FOR INDEPENDENT AUDIT AND ASSESSMENT FRAMEWORK FOR AI SYSTEMS

(71) Applicants: Siddharth Srivastava, Tempe, AZ (US); Pulkit Verma, Tempe, AZ (US)

(72) Inventors: Siddharth Srivastava, Tempe, AZ (US); Pulkit Verma, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 18/942,117

(22) Filed: Nov. 8, 2024

(65) Prior Publication Data

US 2025/0148026 A1 May 8, 2025

Related U.S. Application Data

(60) Provisional application No. 63/597,259, filed on Nov. 8, 2023.

(51) Int. Cl.
| | |
|---|---|
| *G06F 16/953* | (2019.01) |
| *G06F 16/242* | (2019.01) |
| *G06F 16/29* | (2019.01) |
| *G06F 40/30* | (2020.01) |

(52) U.S. Cl.
CPC .......... *G06F 16/953* (2019.01); *G06F 16/243* (2019.01); *G06F 16/29* (2019.01); *G06F 40/30* (2020.01)

(58) Field of Classification Search
None
See application file for complete search history.

(56) References Cited

U.S. PATENT DOCUMENTS

| | | | | |
|---|---|---|---|---|
| 6,556,960 | B1 * | 4/2003 | Bishop | G06F 17/18 703/22 |
| 2021/0046953 | A1 * | 2/2021 | Indelman | B60W 30/0953 |
| 2022/0215141 | A1 * | 7/2022 | Gutierrez | G06F 17/18 |

OTHER PUBLICATIONS

Verma et al., Asking the Right Questions: Learning Interpretable Action Models Through Query Answering, In Proceedings of the 35th AAAI Conference on Artificial Intelligence (AAAI 2021), Vancouver, Canada (Virtual), 10 pages.
Verma et al., Discovering User-Interpretable Capabilities of Black-Box Planning Agents, In Proceedings of the 19th International Conference on Principles of Knowledge Representation and Reasoning (KR 2022), Haifa, Israel, 11 pages.
Nayyar et al., Differential Assessment of Black-Box AI Agents, in Proceedings of the 36th AAAI Conference on Artificial Intelligence (AAAI 2022), Vancouver, BC, Canada (Virtual), 9 pages.

* cited by examiner

*Primary Examiner* — Amresh Singh
(74) *Attorney, Agent, or Firm* — Polsinelli PC

(57) ABSTRACT

Example systems and methods for AI capability assessment include query-based assessment of sequential decision making agents (SDMAs) in stochastic settings with minimal assumptions on SDMA internals. In these examples, a new approach is presented for modeling the capabilities of black-box AI systems by using an active learning approach that can effectively interact with the black-box AI systems and learn an interpretable probabilistic model describing the capabilities of the black-box AI systems.

8 Claims, 15 Drawing Sheets

```
(:capability pick-item
 :parameters (?location ?item)
 :precondition (and
   (empty-arm) (has-charge)
   (robot-at ?location)
   (at ?location ?item))
 :effect (and (probabilistic
   0.7 (and (not (empty-arm))
       (not (at ?location ?item))
       (holding ?item))
   0.2 (and (not (has-charge)))
   0.1 (and)))
                    #No-change
```

FIG. 2

```
(:action pick-item
 :parameters (?location ?item)
 :precondition (and
   (empty-arm) (has-charge)
   (robot-at ?location)
   (at ?location ?item))
 :effect (oneof
   (and (not (empty-arm))
     (not (at ?location ?item))
     (holding ?item))
   (and (not (has-charge)))))
```

FIG. 6

SYSTEMS AND METHODS FOR INDEPENDENT AUDIT AND ASSESSMENT FRAMEWORK FOR AI SYSTEMS

CROSS REFERENCE TO RELATED APPLICATIONS

This is a non-provisional application that claims benefit to U.S. Provisional Application Ser. No. 63/597,259, filed on Nov. 8, 2023; which is herein incorporated by reference in its entirety.

GOVERNMENT SUPPORT

This invention was made with government support under 1844325 and 1942856 awarded by the National Science Foundation and under N00014-21-1-2045 by the Office of Naval Research. The government has certain rights in the invention.

FIELD

The present disclosure generally relates to artificial intelligence systems; and in particular, to examples of a system and associated methods for auditing and assessing AI systems without knowledge of internals of AI systems and using improved query generation methods.

BACKGROUND

Conventional verification and validation paradigms assume design-time knowledge of system specifications and use-case requirements. Both assumptions are invalidated by AI systems because: (a) user-assigned tasks (use-cases) can change in an idiosyncratic fashion, forcing the AI system to act in ways that may never have been observed before, and (b) variations in user-specific deployment environments can necessitate new behaviors that were never observed during design and pre-deployment testing phases.

Furthermore, AI systems can change because of developer's own software updates that may be inscrutable to the users and safety auditors; it is impossible to test, at design time, how these changes would affect deployed AI system behavior, when the deployments feature millions of different users, user-specific tasks, and user-specific environments.

It is with these observations in mind, among others, that various aspects of the present disclosure were conceived and developed.

BRIEF DESCRIPTION OF THE DRAWINGS

FIG. 2 is a probabilistic planning domain definition language (PPDDL) description for the café server robot's pick-item capability.

FIG. 6 is a FOND description for the pick-item capability of the café server robot described herein.

Corresponding reference characters indicate corresponding elements among the view of the drawings. The headings used in the figures do not limit the scope of the claims.

DETAILED DESCRIPTION

Aspects of the present disclosure relate to various examples of systems for assessing the capability of AI systems. Some examples include query-based assessment of sequential decision making agents (SDMAs) in stochastic settings with minimal assumptions on SDMA internals. In these examples, a new approach is presented for modeling the capabilities of black-box AI systems by using an active learning approach that can effectively interact with the black-box AI systems and learn an interpretable probabilistic model describing the capabilities of the black-box AI systems.

First Example: General Framework for AI Capability Assessment

A framework outlined herein enables end-users and third-party auditors to evaluate and assess the limits of safe operability of an independently developed AI device. The framework supports AI system developers by imposing minimal internal constraints on the AI device. The framework fills a critical gap in evaluating safety of emerging AI technology and answers numerous highly publicized calls for increasing regulatory efforts on AI by enabling safety audits of arbitrarily developed AI systems.

Figure 1A:
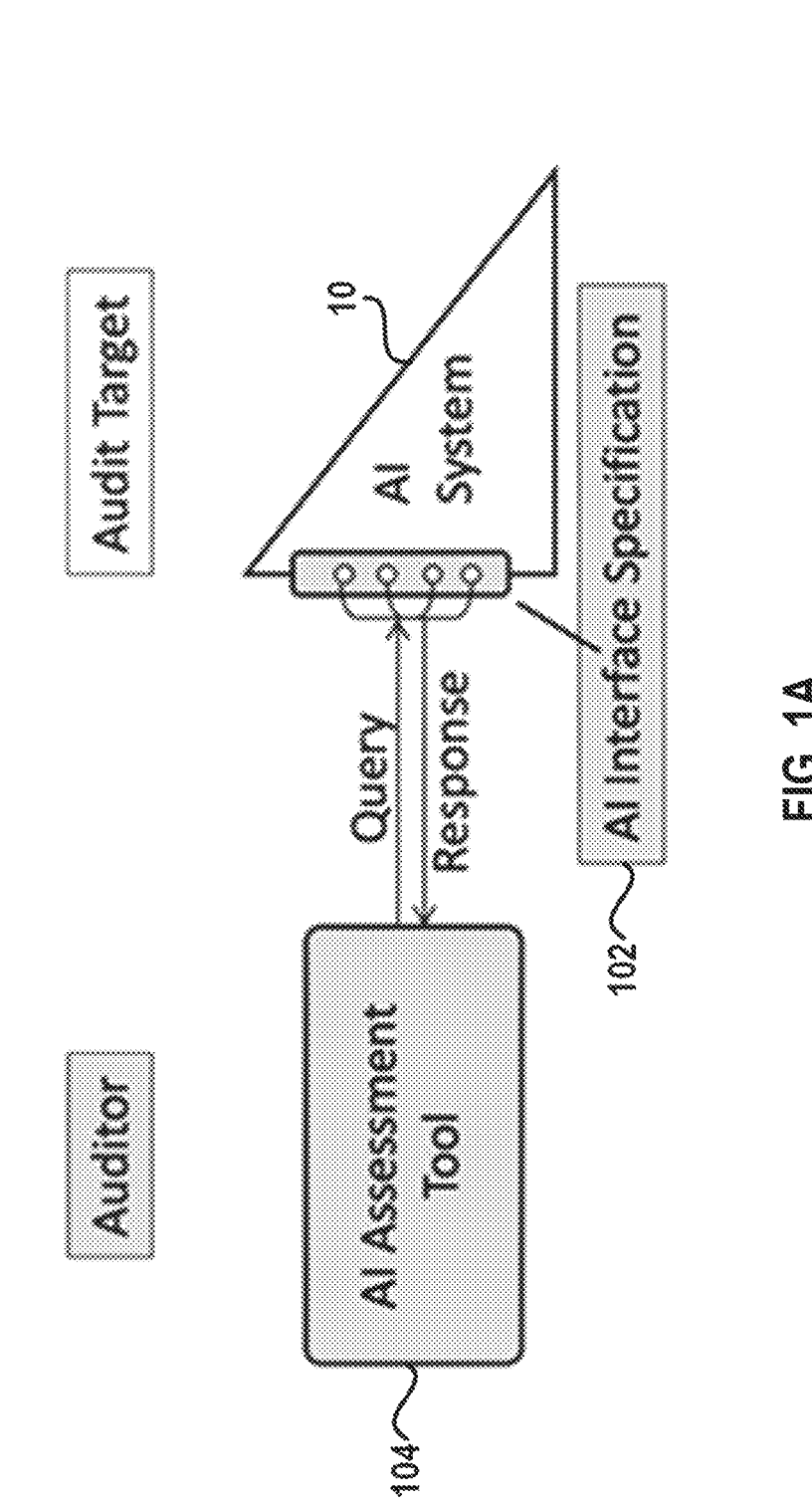
FIG. 1A is a simplified diagram showing an example framework for auditing and assessment of an AI system.

Referring to FIG. 1A, a framework 100 can include two parts: an AI Interface Specification (AIIS) 102 that can support audit systems and an AI Assessment Tool (AIAT) 104 that can audit any AI system (hereinafter, target system 10) that follows the AIIS 102. AIIS 102 is a specification of minimal requirements on input-output formats that an underlying target system 10 (the auditee) must support to be amenable to audit by AIAT 104. AIAT 104 comprises of novel algorithms that use the AIIS 102 to interact with the AI device and evaluate it. Following this interaction, AIAT 104 provides a report on compliance of the auditee with respect to user-specified regulatory guidelines and preferences.

Together, these components allow a user or an auditor to provide desired safety specifications, run the AIAT 104 on a target system 10 that supports the minimal requirements provided by AIIS 102, and obtain reports defining whether the target system 10 meets the desired safety specifications.

Conventional verification and validation paradigms assume design-time knowledge of system specifications and use-case requirements. Both assumptions are invalidated by AI systems because: (a) user-assigned tasks (use-cases) can change in an idiosyncratic fashion, forcing the AI system to act in ways that may never have been observed before, and (b) variations in user-specific deployment environments can necessitate new behaviors that were never observed during design and pre-deployment testing phases.

For instance, a household robot will need to create and execute new behaviors to carry out new tasks conceived by its users (e.g., bring me a cup of coffee on one day, bring me a Philips head screw-driver on the next). It will also need to change its behavior for a previously encountered objective to adapt to changes in the environment (e.g., if someone moved a few chairs around and the robot cannot re-use the same movement paths, or if the coffee powder has run out and it needs to first grind a new batch of beans). In other words, AI systems are designed to adapt and change with the situation even when they are not actively learning.

Furthermore, AI systems can change because of developer's own software updates that may be inscrutable to the users and safety auditors; it is impossible to test, at design time, how these changes would affect deployed AI system behavior, when the deployments feature millions of different users, user-specific tasks, and user-specific environments.

All these factors invalidate the conventional paradigm of verification and validation and make it difficult to adapt to the context of AI systems. Moreover, these factors are already pervasive in currently available AI systems ranging from household robots to chat bots. A new safety analysis paradigm is required for safe usability of taskable AI systems in risk-sensitive situations such as disaster recovery and household robotics.

The framework 100 addresses this absence of tools for safe usability of AI systems. It builds upon recent work on algorithms for AI-capability assessment by the inventor to develop an AI assessment paradigm comprising of two components.

The AIIS 102 specifies the set of inputs that the target system 10 should be able to accept, and the types of outputs it must yield, to support audits in this paradigm. Notably, this specification does not place any restrictions on the internal design of target systems 10, and it does not require access to the internal source code or network weights of the target system 10 to be audited.

AIIS 102 is complemented by the AIAT 104, which uses a well-defined algorithmic process to generate inputs (henceforth referred to as "queries" to avoid confusion) for the target system 10 that conform to AIIS 102. AIAT 104 observes the outputs (henceforth referred to as "responses") produced by the target system 10. AIAT 104 may choose to generate new queries and this query-response process continues until the AIAT 104 chooses to stop. At this point, AIAT 104 returns to the user a description of the capabilities of the target system 10.

AI Auditing and Assessment Framework

Taskable AI systems are designed to adapt and change to accommodate variations in user-desired tasks and deployment environments. However, there are no effective tools for allowing users to assess whether an AI system would be able to safely achieve a given task.

In the framework 100 of FIG. 1A, any target system 10 that supports a well-defined AIIS 102 will be auditable by the AI Assessment Tool that supports that interface. Examples of meaningful AIIS 102 are shown in Table 1. All of the examples in this figure illustrate AIIS protocols that are commonly supported and naturally required in taskable AI systems, e.g., target system 10. For instance, a taskable AI system that does not support AIIS 102 for row (1) in Table 1 would be unusable as it would not be able to accept user commands. Different AI systems may support different instances of these specifications.

TABLE 1

Examples of commonly supported AI Interface Specifications

| | Input to AI System | Output From AI System | Relationship Between I/P & O/P |
|---|---|---|---|
| 1. | State s, User Command c | Execution sequence e | AI system executes e when it receives user command c starting from state s |
| 2. | State s, Partial policy p | Execution sequence e | AI system executes e when asked to executed partial policy p starting from state s |
| 3. | State s, State set X | Execution sequence e | AI system executes e when asked to achieve one of the states in X |

Figure 1B:
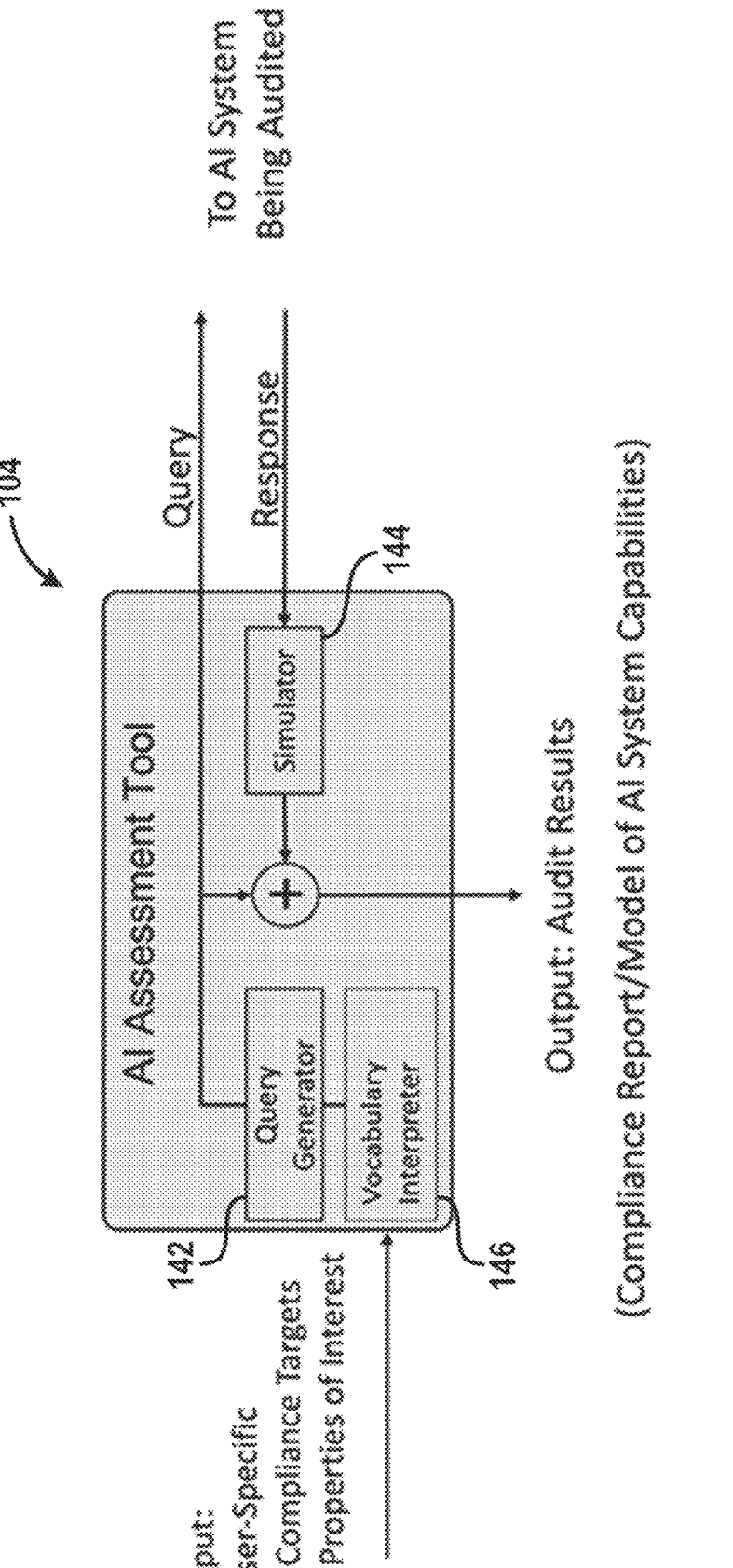
FIG. 1B is a simplified diagram showing an AI Assessment Tool (AIAT) of the framework of FIG. 1A.

FIG. 1B shows the design of the AIAT 104. AIAT 104 maintains a set of possible models describing the target system 10. Initially, this set of models is the implicitly defined space of all possible models. The AIAT 104 includes a query-generator 142 that creates queries designed to disambiguate between two large but disjoint sets of such models. The query-generator 142 is designed using foundational research results outlined in Appendix A. AIAT 104 includes a simulator 144 to simulate behavior of the target system 10 as a part of its computation. The AIAT 104 includes a vocabulary interpreter 146 to convert simulator states into terms used to specify user-specific compliance requirements and desirable properties.

AIAT 104 can be used in two modes. In the audit mode, AIAT 104 receives from its user a logic-based specification of a property of interest, and audits the target system 10 to determine whether the behavior of the target system 10 would comply with this property. In the capability determination mode, AIAT 104 receives from its user a set of state properties of interest and then discovers and describes capabilities of the target system 10 that can lead to states satisfying those properties, along with descriptions of side effects and the conditions under which these capabilities could be used. AIAT 104 uses foundational methods outlined in Appendix B to support differential analysis: it allows the user to quickly identify changes in behavior of the target system 10 and its compliance with safety properties following any changes in the target system 10 since its previous assessment. Differential analysis utilizes the results of the previous assessment to conduct a partial reassessment specific to aspects of the target system 10 that may have changed.

The inventive concepts disclosed herein, particularly in Appendix C, address the foundational problem of learning the possible effects of the known capabilities of an AI system. The concepts outlined herein goes beyond the narrow scope of Appendices A and B to support (a) the discovery of new capabilities of AI systems, and (b) the process of auditing an AI system for compliance with respect to user-specific properties and preferences (which can include temporally extended requirements such as: "the robot should visit the trash bin at least once every 25 minutes")

Advantages and Impact

The framework 100 features several attributes that make it uniquely viable amidst the recent advances in the development of AI systems.

Unlike existing methods and proposed approaches for AI assessment, the framework 100 does not require access to the internal implementation and/or source code or network weights used to design the target system 10 that needs to be evaluated. Keeping internal designs and implementation details of software systems proprietary has been a long-standing principle in monetizing and protecting IP rights of software designers. As software systems, AI system designers continue to adhere to this principle. The framework 100 conducts assessment of the target system 10 without knowledge of the internals and distinguishes it from other related approaches that require access to internals or prescribe specific approaches for implementing the target system 10.

Existing approaches for AI modeling and model learning utilize raw observations of AI behavior to estimate what it would do in different situations but lack the ability to generate meaningful queries. This makes the learning process inefficient. Furthermore, models learned by such approaches are often incorrect and they cannot guarantee correctness. This is because the inability to generate queries makes it impossible for these approaches to conduct counterfactual reasoning, which is essential for deriving causally accurate models of AI system behavior. The AIAT 104 of the framework 100 features an approach for generating queries that extracts meaningful information about how the target system 10 would respond in different settings. AIAT 104 then uses this information to create a model of how the target system 10 will react in different settings, and for different user-desired tasks. Intelligent query synthesis performed by AIAT 104 also reduces evaluation time and enables it to carry out AI assessment much more efficiently than possible using existing approaches.

Unlike existing approaches, the framework 100 also supports efficient differential assessment, a process by which AIAT 104 can assess the changes in behavior of the target system 10 given its past assessment and the variations in user-desired tasks or in the environmental configuration. Using this information, differential assessment can often compute the updated capability model of the AI system faster than a complete re-assessment.

Finally, the framework 100 uses logic-based and natural-language based representations to make the derived models of AI system capabilities more readily understandable by human users and auditors.

There appears to be a lack of platforms for AI capability assessment that can be applied to arbitrary taskable AI systems without making prescriptive assumptions about their internal design and without requiring knowledge of specific aspects of the implementation of the target system 10. Existing approaches and proposals by other teams require access to internals, e.g., network architecture and weights, or alternatively, rely on error-prone passive analysis of observed AI system behavior without the means to generate meaningful queries that can glean the information necessary to conduct more accurate safety analyses.

The framework 100 provides a broadly viable automated approach for evaluating the limits of applicability of arbitrary taskable AI systems. It has the potential to make AI systems developed by a panoply of manufactures more deployable. The framework 100 enables compliance auditing with respect to specific safety guidelines for AI systems: a property that has remained elusive thus far and has limited research and development on widely deployable, safe AI systems.

Methods

In one aspect, a method corresponding with the AIAT 104 of the framework 100 and implementable by a computing device includes: accessing information including a logic-based specification of a property of interest, the logic-based specification defining minimal assessment requirements for a target AI system related to the property of interest; and generating a series of queries to estimate changes associated with the target AI system relative to the property of interest to assess compliance of the target AI system with the minimal assessment requirements. The method can further include: generating a first query to be applied as input to a target system; accessing, from the target system, a first response from the target system responsive to the first query; generating, based on the first response, a second query to be applied as input to the target system; and outputting a description of behaviors of the target system with respect to the information.

For "audit mode" described above, the information can include information about safety specifications. For "capability determination mode", the information can include information about a set of state properties of interest.

Further, for "capability determination mode", the method can include generating, based on the information including a set of state properties of interest, one or more queries to be applied as input to the target system that would lead to output states satisfying the set of state properties of interest;

and identifying, based on one or more responses of the target system that are responsive to the one or more queries, one or more capabilities of the target system that lead to output states satisfying the set of state properties of interest. The method can further include: identifying, based on the one or more responses of the target system, one or more side effects of the output states; and identifying, based on the one or more queries and the one or more responses of the target system, conditions for use of the one or more capabilities of the target system that lead to output states satisfying the set of state properties of interest.

For differential assessment, the method can further include: generating, following an update of the target system and based on the information, a third query to be applied as input to the target system; accessing, from the target system, a third response from the target system responsive to the third query; and identifying, based on the third response and based on the first response and the second response, one or more behavioral changes of the target system following the update of the target system.

The method can also include steps associated with the AIIS 102 of the framework 100. These steps include: accessing the information including a set of inputs that the target system should be able to accept and a set of outputs that the target system should produce responsive to the set of inputs; applying, based on the set of inputs that a target system should be able to accept, a first input to the target system that corresponds with the first query; receiving, responsive to the first query, a first output from the target system responsive to the first input; and translating, based on the set of inputs that the target system should be able to accept, the first query into the first input for application to the target system.

Second Example: Autonomous Capability Assessment of Sequential Decision-Making Systems in Stochastic Settings

1. Introduction

AI systems are becoming increasingly complex, and it is becoming difficult even for AI experts to ascertain the limits and capabilities of such systems, as they often use black-box policies for their decision-making process [Popov et al., 2017, Greydanus et al., 2018]. E.g., consider an elderly couple with a household robot that learns and adapts to their specific household. How would they determine what it can do, what effects their commands would have, and under what conditions? Although we are making steady progress on learning for sequential decision-making (SDM), the problem of enabling users to understand the limits and capabilities of their SDM systems is largely unaddressed. Moreover, as the example above illustrates, the absence of reliable approaches for user-driven capability assessment of AI systems limits their inclusivity and real-world deployability.

The present disclosure presents a new approach for Query-based Autonomous Capability Estimation (QACE) of black-box SDM systems in stochastic settings. The approach uses a restricted form of interaction with the input SDM agent (referred to as SDMA) to learn a probabilistic model of its capabilities. The learned model captures high-level user-interpretable capabilities, such as the conditions under which an autonomous vehicle could back out of a garage, or reach a certain target location, along with the probabilities of possible outcomes of executing each such capability. The resulting learned models directly provide interpretable representations of the scope of SDMA's capabilities. They can also be used to enable and support approaches for explaining SDMA's behavior that require closed-form models (e.g., Sreedharan et al. [2018]). It is assumed that the input SDMA provides a minimal query-response interface that is already commonly supported by contemporary SDM systems. In particular, SDMA should reveal capability names defining how each of its capabilities can be invoked, and it should be able to accept user-defined instructions in the form of sequences of such capabilities. These requirements are typically supported by SDM systems by definition.

The main technical problem for QACE is to automatically compute "queries" in the form of instruction sequences and policies, and to learn a probabilistic model for each capability based on SDMA's "responses" in the form of executions. Depending on the scenario, these executions can be in the real world, or in a simulator for safety-critical settings. Since the set of possible queries of this form is exponential in the state space, naïve approaches for enumerating and selecting useful queries based on information gain metrics are infeasible.

Main Contributions.

The inventive concept described herein presents the first approach for query-based assessment of SDMAs in stochastic settings with minimal assumptions on SDMA internals. In addition, it is also the first approach for reducing query synthesis for SDMA assessment to full-observable non-deterministic (FOND) planning [Cimatti et al., 1998]. Empirical evaluation shows that these contributions enable the instant approach to carry out scalable assessment in both embodied and vanilla SDMAs.

The learned models are expressed using an input concept vocabulary that is known to the target user group. Such vocabularies span multiple tasks and environments. They can be acquired through parallel streams of research on interactive concept acquisition [Kim et al., 2015, Lage and Doshi-Velez, 2020] or explained to users through demonstrations and training [Schulze et al., 2000]. These concepts can be modeled as binary-valued predicates that have their associated evaluation functions [Mao et al., 2022]. We use the syntax and semantics of a well-established relational SDM model representation language, Probabilistic Planning Domain Definition Language (PPDDL) Younes and Littman, 2004], to express the learned models.

Related work on the problem addresses model learning from passively collected observations of agent behavior [Pasula et al., 2007, Martinez et al., 2016, Juba and Stern, 2022]; and by exploring the state space using simulators [Chitnis et al., 2021, Mao et al., 2022]. However, passive learning approaches can learn incorrect models as they do not have the ability to generate interventional or counterfactual data; exploration techniques can be sample inefficient because they don't take into account uncertainty and incompleteness in the model being learned to guide their exploration (see Sec. 7 for additional description).

In addition to the key contributions mentioned earlier, the subject results (Sec. 6) show that the approaches for query synthesis in this paper do not place any additional requirements on black-box SDMAs but significantly improve the following factors: (i) convergence rate and sample efficiency for learning relational models of SDMAs with complex capabilities, (ii) few-shot generalizability of learned models to larger environments, and (iii) accuracy of the learned mode with respect to ("w.r.t.") the ground truth SDMA capabilities. convergence rate to the sound and complete model.

2. Preliminaries

SDMA setup. We consider SDMAs that operate in stochastic and fully observable environments. An SDMA can be represented as a 3-tuple $\langle \mathcal{X}, \mathcal{C}, \mathcal{T} \rangle$, where $\mathcal{X}$ is the environment state space that the SDMA operates in, $\mathcal{C}$ is the set of SDMA's capabilities (capability names, e.g., "place object x at location y" or "arrange table x") that the SDMA can execute, and $\mathcal{T}: \mathcal{X} \times \mathcal{C} \rightarrow \mu\mathcal{X}$ is the stochastic black-box transition model determining the effects of SDMA's capabilities on the environment. Here, $\mu\mathcal{X}$ is the space of probability distributions on $\mathcal{X}$. Note that the semantics of $\mathcal{C}$ are not known to the user(s) and $\mathcal{X}$ may not be user-interpretable. The only information available about the SDMA is the instruction set in the form of capability names, represented as $C_N$. This isn't a restricting assumption as the SDMAs must reveal their instruction sets for usability.

Running Example. Consider a cafe server robot that can pick and place items like plates, cans, etc., from various locations in the cafe, like the counter, tables, etc., and also move between these locations. A capability pick-item (?location ?item) would allow a user to instruct the robot to pick up an item like a soda can for any location. However, without knowing its description, the user would not know under what conditions the robot could execute this capability and what the effects will be.

Figure 1C:
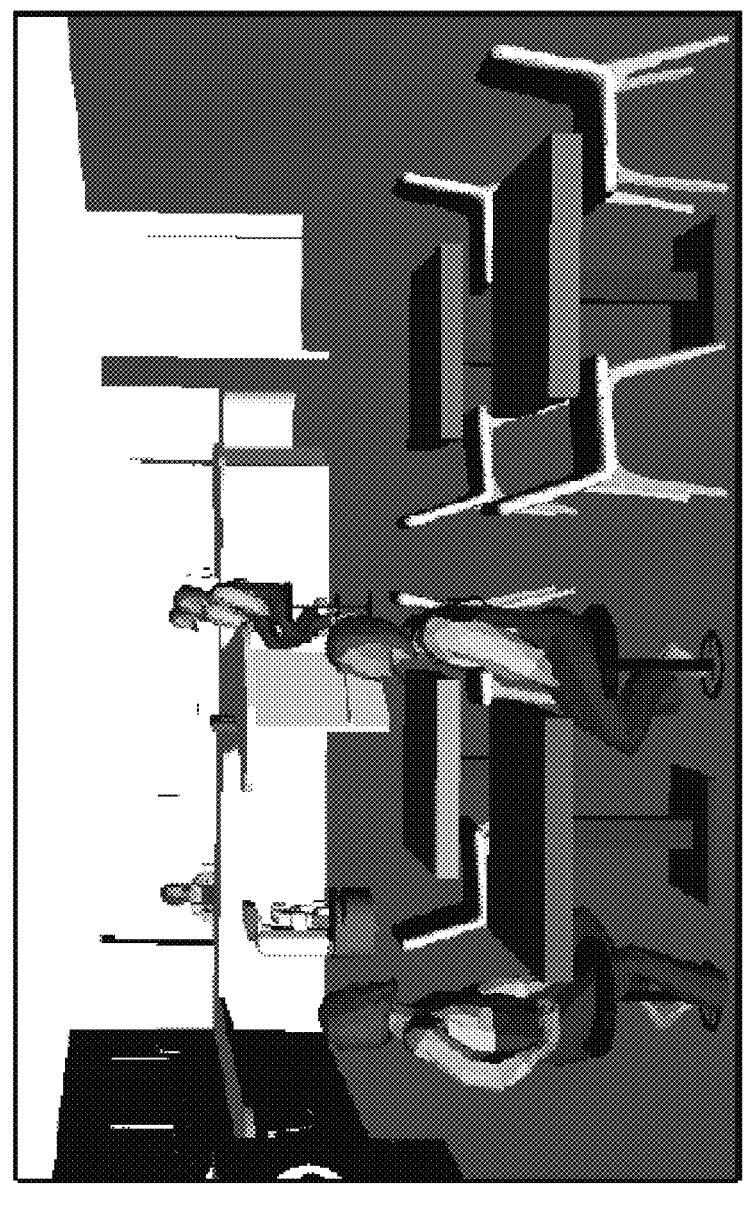
FIG. 1C is an illustration of a café server robot environment in OpenRave simulator as described herein.
Figure 3:
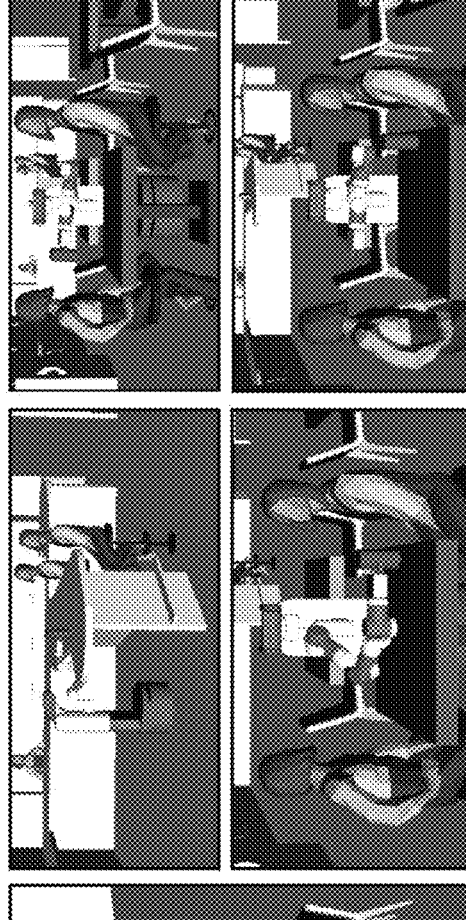
FIG. 3 is an illustration of screen captures from the Café Server Robot simulation described herein (showing the complete environment in the image on the left, and showing on the right screen captures of multiple steps of the robot delivering a soda-can to a table).
Figure 3:
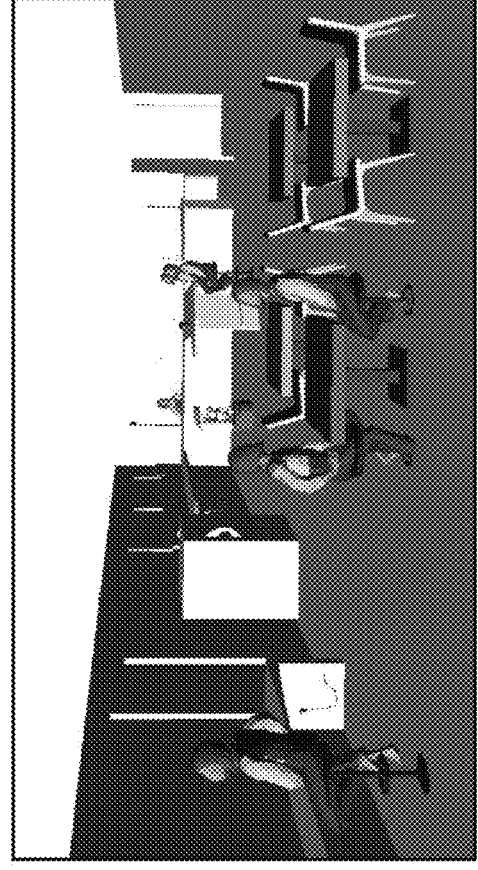

Object-centric concept representation. We aim to learn representations that are generalizable, i.e., the transition dynamics learned should be impervious to environment-specific properties such as numbers and configurations of objects. Additionally, the learned capability models should hold in different settings of objects in the environment as long as the SDMA's capabilities does not change. To this effect, we learn the SDMA's transition model in terms of in-concepts that can be represented using first-order logic predicates. This is a common formalism for expressing the symbolic models of SDMAs [Zhi-Xuan et al., 2020, Mao et al., 2022]. We formally represent them using a set of object-centric predicates P. The set of predicates used for cafe server robot in FIG. 1C can be (robot-at ?location), (empty-arm), (has-charge), (at ?location?item), and (holding?item). Here,? precedes an argument that can be replaced by an object in the environment. E.g., (robot-at tableRed) means "robot is at the red table." As mentioned earlier, we assume these predicates along with their Boolean evaluation functions (which evaluate to true if predicate is true in a state) are available as input. Learning such predicates is also an interesting but orthogonal direction of research [Mao et al., 2022, Sreedharan et al., 2022, Das et al., 2023].

Abstraction. Using an object-centric predicate representation induces an abstraction of environment states $\mathcal{X}$ to high-level logical states $\mathcal{S}$ expressible in predicate vocabulary P. This abstraction can be formalized using a surjective function $f:\mathcal{X} \rightarrow \mathcal{S}$. E.g., in the cafe server robot, the concrete state x may refer to roll, pitch, and yaw values. On the other hand, the abstract states corresponding to x will consist of truth values of all the predicates [Srivastava et al., 2014, 2016, Mao et al., 2022].

Probabilistic transition model. Abstraction induces an abstract transition model T': $\mathcal{S} \times \mathcal{C} = \rightarrow \mu$s, where $\mu\mathcal{S}$ is the space of probability distributions on $\mathcal{S}$. This is done by converting each transition $\langle x, c, x' \rangle \in T$ to $\langle s, c, s' \rangle \in T'$ using predicate evaluators such that f(x')=s and f(x')=s'. Now, T' can be expressed as model M that is a set of parameterized action (capability in our case) schema, where each c$\in \mathcal{C}$ is described as c=$\langle$ name(c), pre(c), eff(c)$\rangle$, where name(c)$\in$ $\mathcal{C}_N$ refers to name and arguments (parameters) of c; pre(c) refers to the preconditions of the capability c represented as a conjunctive formula defined over P that must be true in a state to execute c; and eff(c) refers to the set of conjunctive formulas over P, each of which becomes true on executing c with an associated probability. The result of executing c for a model M is a state c(s)=s' such that $P_M(s'|s, c)>0$ and one (and only one) of the effects of c becomes true in s'. We also use $\langle s, c, s' \rangle$ triplet to refer to c(s)=s'. This representation is similar to the Probabilistic Planning Domain Definition Language (PPDDL), which can compactly describe the SDMA's capabilities. E.g., the cafe server robot has three capabilities (shown here as name (args)): pick-item (?location?item); place-item (?location?item); and move (?source?destination). The description of pick-item in PPDDL is shown in FIG. 2.

Variational Distance. Given a black-box SDMA $\mathcal{A}$, we learn the probabilistic model M representing its capabilities. To measure how close M is to the true SDMA transition model T', we use variational distance-a standard measure in probabilistic-model learning literature [Pasula et al., 2007, Martinez et al., 2016, Ng and Petrick, 2019, Chitnis et al., 2021]. It is based on the total variation distance between two probability distributions T' and M, given as:

$$\delta(T', M) = \frac{1}{|\mathcal{D}|} \sum_{\langle s,c,s' \rangle \in \mathcal{D}} |P_{T'}(s' \mid s, c) - P_M(s' \mid s, c)| \tag{1}$$

where $\mathcal{D}$ is the set of test samples ($\langle s, c, s' \rangle$ triplets) that we generate using T' to measure the accuracy of our approach. As shown by Pinsker [1964], $\delta(T', M) \leq \sqrt{0.5 \times D_{KL}(T'\|M)}$, where $D_{KL}$ is the KL divergence.

3. The Capability Assessment Task

In this work, we aim to learn a probabilistic transition model T' of a black-box SDMA as a model M, given a set of user-interpretable concepts as predicates P along with their evaluation functions, and the capability names $C_N$ corresponding to the SDMA's capabilities. Formally, the assessment task is:

Definition 1. Given a set of predicates P along with their Boolean evaluation functions, capability names $C_N$, and a black-box SDMA $\mathcal{A}$ in a fully observable, stochastic, and static environment, the capability assessment task $\langle \mathcal{A}, P, C_N T' \rangle$ is defined as the task of learning the probabilistic transition model T' of the SDMA $\mathcal{A}$ expressed using P.

The solution to this task is a model M that should ideally be the same as T' for correctness. In practice, T' need not be in PPDDL, so the correctness should be evaluated along multiple dimensions.

Notions of model correctness. As discussed in Sec. 2, variational distance is one way to capture the correctness of the learned model. This is useful when the learned model and the SDMA's model are not in the same representation. The correctness of a model can also be measured using qualitative properties such as soundness and completeness. The learned model M should be sound and complete w.r.t. the SDMA's high-level model T', i.e., for all combinations of c, s, and s', if a transition $\langle s, c, s' \rangle$ is possible according to T', then it should also be possible under M, and vice versa. Here, $\langle s, c, s' \rangle$ is consistent with M (or T') if P(s'|s, c)>0 according to M (or T'). We formally define this as:

Definition 2. Let $\langle \mathcal{A}, P, C_N, T \rangle$ be a capability assessment task with a learned model M as its solution. M is sound iff each transition $\langle s, c, s' \rangle$ consistent with M is also consistent with T'. M is complete iff every transition that is consistent with T' is also consistent with M.

This also means that if T' is also a PPDDL model, then (i) any precondition or effect learned as part of M is also present in T' (soundness); and (ii) all the preconditions and effects present in T' should be present in M (completeness). Additionally, a probabilistic model is correct if it is sound and complete, and the probabilities for each effect set in each of its capabilities are the same as that of T'.

4. Interactive Capability Assessment

To solve the capability assessment task, we must identify the preconditions and effects of each capability in terms of conjunctive formulae expressed over P. At a very high-level, we do this by identifying that a probabilistic model can be expressed as a set of capabilities $c \in C$, each of which has two places where we can add a predicate p, namely precondition and effect. We call these locations within each capability. We then enumerate through these $2 \times |C|$ locations and figure out the correct form of each predicate at each of those locations. To do this we need to consider three forms: (i) adding it as p, i.e., the predicate must be true for that capability to execute (when the location is precondition), or it becomes true on executing it (when the location is effect); (ii) adding it as not(p), i.e., the predicate must be false for that capability to execute (when the location is precondition), or it becomes false on executing it (when the location is effect); (iii) not adding it at all, i.e., the capability execution does not depend on it (when the location is precondition), or the capability does not modify it (when the location is effect).

Model pruning. Let M represent the set of all possible transition models expressible in terms of P and C. We must prune the set of possible models to solve the capability assessment task, ideally bringing it to a singleton. We achieve this by posing queries to the SDMA and using the responses to the queries as data to eliminate the inconsistent models from the set of possible models M.

Given a location (precondition or effect in a capability), the set of models corresponding to a predicate will consist of 3 transition models: one each corresponding to the three ways we can add the predicate in that location. We call these three possible models $M_T$, $M_F$, $M_I$, corresponding to adding p (true), not(p) (false), and not adding p (ignored), respectively at that location.

Note that the actual set of possible transition models is infinite due to the probabilities associated with each transition. To simplify this, we first constrain the set of possible models by ignoring the probabilities, and learn a non-deterministic transition model (commonly referred to as a FOND model [Cimatti et al., 1998]) instead of a probabilistic one. We later learn the probabilities using maximum likelihood estimation based on the transitions observed as part of the query responses.

Simulator use. Using the standard assumption of a simulator's availability in research on SDM, QACE solves capability assessment task (Sec. 3) by issuing queries to the SDMA and observing its responses in the form of its execution in the simulator. In non-safety-critical scenarios, this approach can work without a simulator too. The interface required to answer the queries is rudimentary as the SDMA A need not have access to its transition model T' (or T). Rather, it should be able to interact with the environment (or a simulator) to answer the queries. We next present the types of queries we use, followed by algorithms for generating them and for inferring the SDMA's model using its responses to the queries.

Policy simulation queries ($Q_{PS}$) These queries ask the SDMA A to execute a given policy multiple times. More precisely, a $Q_{PS}$ query is a tuple(s) $\langle s_I, \pi, G, \alpha, n \rangle$ where $s_I \in S$ is a state, $\pi$ is a partial policy that maps each reachable state to a capability, G is a logical predicate formula that expresses a stopping condition, a is an execution cutoff bound representing the maximum number of execution steps, and n is an attempt limit. Note that the query (including the policy) is created entirely by our solution approach without any interaction with the SDMA. $Q_{PS}$ queries ask A to execute, $\pi$, n times. In each iteration, execution continues until either the stopping goal condition G or the execution bound $\alpha$ is reached. E.g., "Given that the robot, soda-can, plate1, bowl3 are at table4, what will happen if the robot follows the following policy: if there is an item on the table and arm is empty, pick up the item; if an item is in the hand and location is not dishwasher, move to the dishwasher; if an item is in the hand and location is dishwasher, place the item in the dishwasher?" Such queries will be used to learn both preconditions and effects (Sec. 4.3).

A response to such queries is an execution in the simulator and n traces of these simulator executions. Formally, the response $\theta_{PS}$ for a query $q_{PS} \in Q_{PS}$ is a tuple $\langle b, \zeta \rangle$, where $b \in \{T, \bot\}$ indicates weather if the SDMA reached a goal state $s_G \models G$, and $\zeta$ are the corresponding triplets $\langle s, c, s' \rangle$ generated during the n policy executions. If the SDMA reaches sc even once during the n simulations, b is T, representing that the goal can be reached using this policy. Next, we discuss how these responses are used to prune the set of possible models and learn the correct transition model of the SDMA.

4.1 Query-Based Autonomous Capability Estimation (QACE) Algorithm

We now discuss how we solve the capability assessment task using the Query-based Autonomous Capability Estimation algorithm (Alg. 1), which works in two phases. In the first phase, QACE learns all capabilities' conditions and non-deterministic effects using the policy simulation queries (Sec. 4.2). In the second phase, QACE converts the non-deterministic effects of capabilities into probabilistic effects (Sec. 4.3). We now explain the learning portion (lines 3-11) in detail.

---

Algorithm 1: QACE Algorithm

Input: predicates P; capability names $C_N$; state s; SDMA A; hyperparameters $\alpha$, n; FOND Planner p
Output: M

```
1   L ← {pre, eff} × C_N
2   M* ← initializedModel (P, C_N)
3   for each 1, p E L, P) do
4          |   Generate M_F, M_I by setting p at 1 in M*
5          | for each pair M_i, M_j in {M_T, M_F, M_I} do
6          |   | q ← generateQuery(M_i, M_j, α, n, s, ρ)
7          |   | θ_A, S ← getResponse(q, A, s)
8          |   | M* ← pruneModels (θ_A, M_i, M_j)
9          |   | M* ← learn possible stochastic effects of
           |   |   capability with c_N in 1 using ζ (in θ_A)
10  M ← learnProbabilitiesOfStochasticEffects(ζ, M*)
11  return M
```

---

QACE first initializes a model M* over the predicates in P with capabilities having names $c_N \in C_N$. All the preconditions and effects for all capabilities are empty in this initial model. QACE uses M* to maintain the current partially learned model. QACE iterates over all combinations of L and P (line 4). For each pair, QACE creates 3 candidate models $M_T$, $M_F$, and $M_I$ as mentioned earlier. It then takes 2 of these (line 5) and generates a query q (line 6) such that responses to the query q from the two models are logically inconsistent (see Sec. 4.2). The query q is then posed to the SDMA A whose response is stored as $\theta_A$ (line 7). QACE finally prunes at least one of the two models by comparing their responses (which are logically inconsistent) with the response $\theta_A$ of the SDMA on that query (line 8). QACE also updates the effects of all models in the set of possible models to speed up the learning process (line 9). Finally, it learns the probabilities of the observed stochastic effects using maximum likelihood estimation (line 10). An important feature of the algorithm (similar to PLEX [Mehta et al., 2011] and AIA [Verma et al., 2021]) is that it keeps track of all the locations where it hasn't identified the correct way of adding a predicate. The next section presents our approach for generating the queries in line 6.

4.2 Algorithms for Query Synthesis

One of the main challenges in interactive model learning is to generate the queries we discussed above and to learn the agent's model using them. Although active learning [Settles, 2012] addresses the related problem of figuring out which data sets to request labels for, vanilla active learning approaches are not directly applicable here because the possible set of queries expressible using the literals in a domain is vast: it is the set of all policies expressible using $C_N$. Query-based learning approaches use an estimate of the utility of a query to select "good" queries. This can be a multi-valued measure like information gain [Sollich and Saad, 1994], value [Macke et al., 2021], etc. or a binary-valued attribute like distinguishability [Verma et al., 2021], etc. We use distinguishability as a measure to identify useful queries. According to it, a query q is distinguishing w.r.t. two models if responses by both models to q are logically inconsistent. We now discuss methods for generating such queries.

Generating distinguishing queries. QACE automates the generation of queries using search. As part of the algorithm, a model M* is used to generate the three possible models $M_T$, $M_F$, and $M_I$ for a specific predicate p and location l combination. Other than the predicate p at location l, these models are exactly the same. A forward search is used to generate the policy simulation queries with two possible models $M_i$, $M_j$ chosen randomly from $M_T$, $M_F$, and $M_I$. The forward search is initiated with an initial state $\langle s_0^i, s_0^j \rangle$ as the root of the search tree, where $s_0^i$ and $s_0^j$ are copies of the same state s, from which we are starting the search. The edges of the tree correspond to the capabilities with arguments replaced with objects in the environment. Nodes correspond to the two states resulting from applying the capability in the parent state according to the two possible models. E.g., consider that a transition $\langle s_0^i, c, s_0^j \rangle$ is possible according to the model $M_i$, and let $\langle s_0^j, c, s_1^j \rangle$ be the corresponding transition (by applying the same effect set of c as $h_i$) according to the model $M_j$. Now there will be an edge in the forward search tree with label c such that parent node is $\langle s_0^i, s_0^j \rangle$ and child node is $\langle s_1^i, s_1^j \rangle$. The search process terminates when a node $\langle s^i, s_j \rangle$ is reached such that either the states $s^i$ and $s^j$ don't match, or the preconditions of the same capability were met in the state according to one of the possible models but not according to the other. Vanilla forward search scales poorly with the number of capabilities and objects in the environment. To address this we reduce the problem to a fully observable non deterministic (FOND) planning problem. This can be solved by any FOND planner. The output of this search is a policy $\pi$ to reach a state where the two models, $M_i$ and $M_j$ predict different outcomes. Additional details about the reduction and an example of the output policy are available in Appendix C.3. The query $\langle s_1, \pi, G, \alpha, n \rangle$ resulting from this search is such that $s_1$ is set to the initial state $s_0$, $\pi$ is the output policy, G is the goal state where the models' responses doesn't match, $\alpha$ and n are hyperparameters as mentioned earlier. We next see how to use these queries to prune out the incorrect models.

4.3 Learning Probabilistic Models Using Query Responses

At this point, QACE already has a query such that the response to the query by the two possible models does not match. We next see how to prune out the model inconsistent with the SDMA. QACE poses the query generated earlier to the SDMA and gets its response (line 7 in Alg. 1). If the SDMA can successfully execute the policy, QACE compares the response of the two models with that of the SDMA and prunes out the model whose response does not match with that of the SDMA. If the SDMA cannot execute the policy, i.e., SDMA fails to execute some capability in the policy, then the models cannot be pruned directly. In such a case, a new initial state $s_0$ must be chosen to generate a new query starting from that initial state. Since generating new queries for the same pair of models can be time consuming, we preempt this issue by creating a pool of states S that can execute the capabilities using a directed exploration of the state space with the current partially learned model as discussed below.

Directed exploration. A partially learned model is a model where one or more capabilities have been learned (the correct preconditions have been identified for each capability and at least one effect is learned). Once we have such a model, we can do a directed exploration of the state space for these capabilities by only executing a learned capability if the preconditions are satisfied. This helps in reducing the sample complexity since the simulator is only called when we know that the capability will execute successfully, thereby allowing us to explore different parts of the state space efficiently. If a capability's preconditions are not learned, all of its groundings might need to be executed from the state. In the worst case, to escape local minima where no models can be pruned, we would need to perform a randomized search for a state where a capability is executable by the SDMA. In practice, we observed that using directed exploration to generate a pool of states gives at least one grounded capability instance. This helps ensure that during query generation, the approach does not spend a long time searching for a state where a capability is executable.

Learning probabilities of stochastic effects. After QACE learns the non-deterministic model, to learn the probabilities of the learned effects it uses the transitions collected as part of responses to queries. This is done using Maximum Likelihood Estimation (MLE) [Fisher, 1922]. For each triplet $\langle s, c, s' \rangle$ seen in the collected data, let $count_c$ be the number of times a capability c is observed. Now, for each effect set, the probability of that effect set becoming true on executing capability c is given as the number of times that effect is observed on executing c divided by $count_c$. As we increase the value of the hyperparameter $\eta$, we increase the number of collected triplets, thereby improving the probability values calculated using this approach.

5. Theoretical Analysis and Correctness

We now discuss how the model M of SDMA A learned using QACE fulfills the notions of correctness (Sec. 3 discussed earlier. We first show that the model M* learned before line 10 of QACE (Alg. 1) is sound and complete according to Def. 2. The proofs for the theorems are available below.

Theorem 1. Let A be a black-box SDMA with a ground truth transition model T' expressible in terms of predicates P and a set of capabilities C. Let M* be the non-deterministic model expressed in terms of predicates P* and capabilities C, and learned using the query-based autonomous capability estimation algorithm (Alg. 1) just before line 10. Let $C_N$ be a set of capability names corresponding to capabilities C. If P*⊑P, then the model M* is sound w.r.t. the SDMA transition model T'. Additionally, if P*=P, then the model M* is complete w.r.t. the SDMA transition model T'.

Next, we show that the final step of learning the probabilities for all the effects in each capability converges to the correct probability distribution under the assumption that all the effects of a capability are identifiable. When a capability c is executed in the environment, one of its effects $e_i(c) \in$ eff (c) will be observed in the environment. To learn the correct probability distribution in M, we should accurately identify that effect $e_i(c)$. Hence, the set of effects is identifiable if at least one state exists in the environment from which each effect can be uniquely identified when the capability is executed. An example of this is available below.

Theorem 2. Let A be a black-box SDMA with a ground truth transition model T' expressible in terms of predicates P and a set of capabilities C. Let M be the probabilistic model expressed in terms of predicates P* and capabilities C, and learned using the query-based autonomous capability estimation algorithm (Alg. 1). Let P=P* and M be generated using a sound and complete non-deterministic model M in line 11 of Alg. 1, and let all effects of each capability c E C be identifiable. The model M is correct w.r.t. the model T' in the limit as n tends to where n is hyperparameter in query $Q_{PS}$ used in Alg. 1.

6. Empirical Evaluation

Alg. 1 was implemented in Python to evaluate the described approach empirically. We found that our query synthesis and interactive learning process leads to (i) few shot generalization; (ii) convergence to a sound and complete model; and (iii) much greater sample efficiency and accuracy for learning lifted SDM models with complex capabilities as compared to the baseline.

Setup. We used a single training problem with few objects (≤7) for all methods in our evaluation and used a test set that was composed of problems containing object counts larger than those in the training set. We ran the experiments on a cluster of Intel Xeon E5-2680 v4 CPUs with CentOS 7.9 running at 2.4 GHz with a memory limit of 8 GB and a time limit of 4 hours. We used PRP [Muise et al., 2012] as the FOND planner to generate the queries (line 6 in Alg. 1). For QACE, we used α=2d where d is the maximum depth of policies used in queries generated by QACE and n=5. All of the methods in our empirical evaluation receive the same training and test sets and are evaluated on the same platform. We used Variational Distance (VD) as presented in Eq. 1 to evaluate the quality of the learned SDMA models.

Baseline selection. We used the closest SOTA related work, GLIB [Chitnis et al., 2021] as a baseline. GLIB learns a probabilistic model of an intrinsically motivated agent by sampling goals far away from the initial state and making the agent try to reach them. This can be adapted to an assessment setting by moving goal-generation based sampling outside the agent, and, to the best of our knowledge, no existing approach addresses the problem of creating intelligent questions for an SDMA. GLIB has two versions, GLIB-G, which learns the model as a set of grounded noisy deictic rules (NDRs) [Pasula et al., 2007], and GLIB-L, which learns the model as a set of lifted NDRs. We used the same hyperparameters as published for the Warehouse Robot and Driving Agent and performed extensive tuning for the others and report results with the best performing settings.

Figure 5:
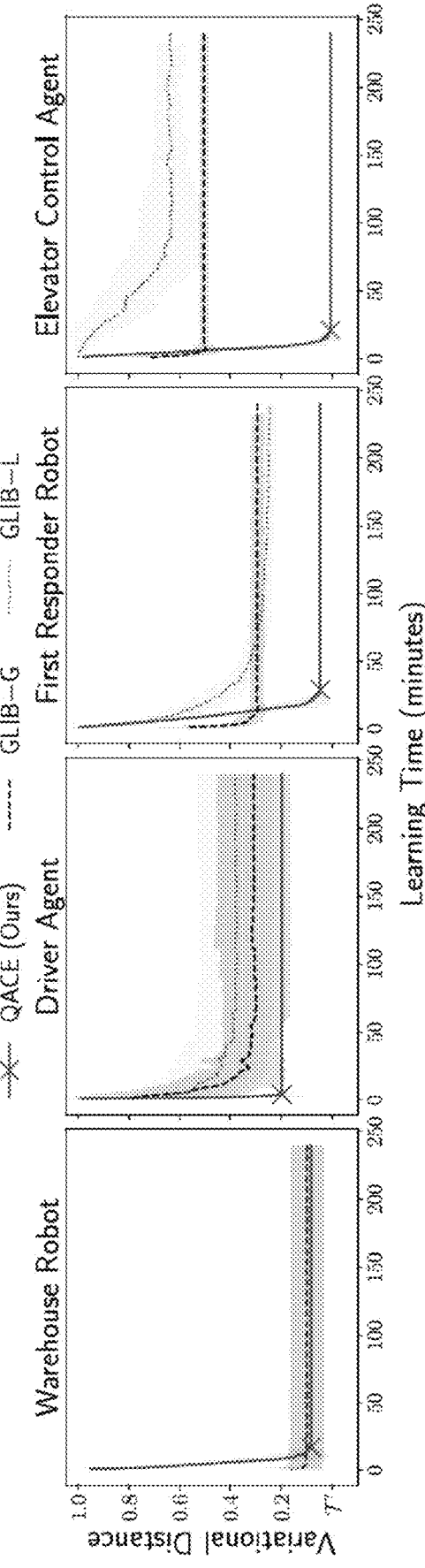
FIG. 5 is a series of graphs illustrating a comparison of the approximate variational distance as a factor of the learning time for the three methods described herein: QACE associated with the subject inventive concept, GLIB-G, and GLIB-L (lower values better)—the results were calculated using 30 runs per method per domain (solid lines are averages across runs, and shaded portions show the standard deviation with T' being the ground truth model).

The models learned using GLIB cannot be used to calculate the variational distance presented in Eq. 1 because for each capability GLIB learns a set of NDRs rather than a unique NDR. In order to maintain parity in comparison, we use GLIB's setup to calculate an approximation of the VD. Using it, we sample 3500 random transitions $\langle s, c, s' \rangle$ from the ground truth transition model T' using problems in the test set to compute a dataset of transitions D. The sample-based, approximate VD is then given as:

$$\frac{1}{|D|} \sum_{d \in D} \mathbb{1}_{[s' \neq c_M(s)]},$$

where $c_M(s)$ samples the transition using the capability in the learned model output by each method. In FIG. 5, we compare the approximate variational distance of the three approaches w.r.t. D as we increase the learning time. Note that we also evaluated VD for QACE using Eq. 1 and found that $\delta(T', M) \approx 0$ our learned model M in all SDMA settings.

SDMAs for evaluation. To test the efficacy of our approach, we created SDMAs for five different settings including one task and motion planning agent and several SDMAs based on state-of-the-art stochastic planning systems from the literature: Cafe Server Robot is a Fetch robot [Wise et al., 2016] that uses the ATM-MDP task and motion planning system [Shah et al., 2020] to plan and act in a restaurant environment to serve food, clear tables, etc.; Warehouse Robot is a robot that can stack, unstack, and manage the boxes in a warehouse; a Driving Agent that can drive between locations and can repair the vehicle at certain locations; a First Responder Robot that can assist in emergency scenarios by driving to emergency spots, providing first-aid and water to victims, etc.; and an Elevator Control Agent that can control the operation of multiple elevators in a building.

6.1 Results

We present an analysis of our approach on all of the SDMAs listed above. We also present a comparative analysis with the baseline on all SDMAs except the Cafe Server Robot, whose task and motion planning system was not compatible with the baseline.

Cafe Server Robot. This SDMA setup uses an 8 degrees of freedom Fetch [Wise et al., 2016] robot in a cafe setting on OpenRave simulator [Diankov and Kuffner, 2008]. The low-level environment state consists of continuous x, y, z, roll, pitch, and yaw values of all objects in the environment. The predicate evaluators were provided by ATM-MDP of

Figure 4:
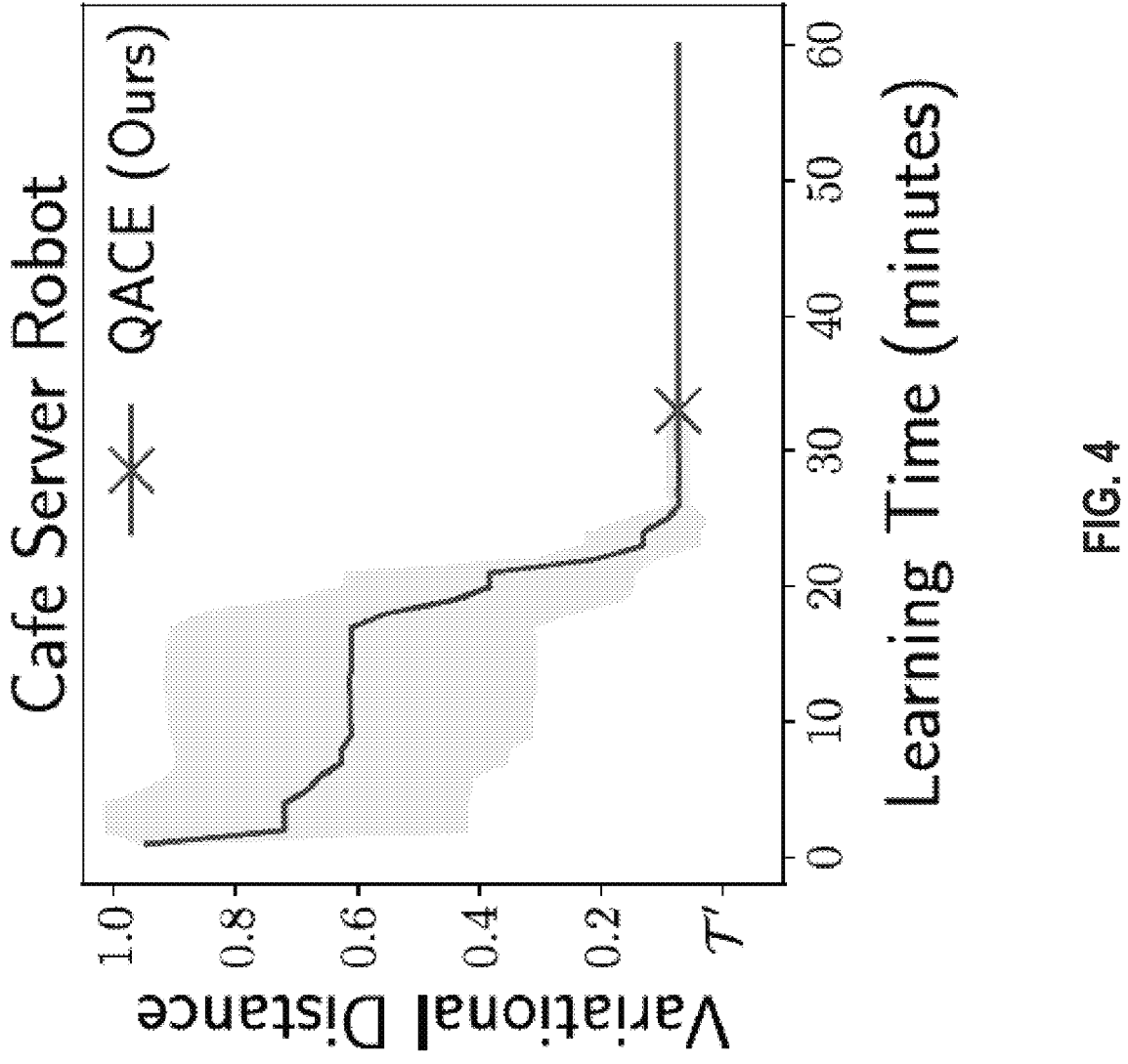
FIG. 4 is a graph illustrating variational distance between the learned model and the ground truth with increasing time for QACE for the Café Server Robot example described herein, with x showing that the learning process ended at that time instance.

17 which we used only a subset to learn a PPDDL model. Each robot capability is refined into motion controls at run-time depending on the configuration of the objects in the environment. The results for variational distance between the learned model and the ground truth model in FIG. 4 show that despite the different vocabulary, QACE learns an accurate transition model for the SDMA.

We now discuss the comparative performance of QACE with the baseline across the four baseline-compatible SDMAs presented above.

Faster convergence. The time taken for QACE to learn the final model is much lower than that of GLIB for three of the four SDMAs. This is because trace collection by QACE is more directed and hence ends up learning the correct model in a shorter time. The only setup where GLIB marginally outperforms QACE is Warehouse Robot, and this happens because this SDMA has just two capabilities, one of which is deterministic. Hence, GLIB can easily learn their configuration from a few observed traces. For SDMAs with complex and much larger number of capabilities-First Responder Robot and Elevator Control Agent-GLIB finds it more challenging to learn the model that is closer to the ground truth transition model. Additionally, QACE takes much fewer samples to learn the model than the baselines. In all settings, QACE is much more sample efficient than the baselines as QACE needed at most 4% of the samples needed by GLIB-G to reach the variational distance that it plateaued at. In contrast, GLIB-L started timing out only after processing a few samples for complex SDMAs.

Few-shot generalization. To ensure that learned models are not overfitted, our test set contains problems with larger quantities of objects than those used during training. As seen in FIG. 5, the baselines have higher variational distance from the ground truth model for complex SDMA setups as compared to QACE. This shows better few-shot generalization of QACE compared to the baselines.

7. Related Work

The problem of learning probabilistic relational agent models from a given set of observations has been studied [Pasula et al., 2007, Mourao et al., 2012, Martinez et al., 2016, Juba and Stern, 2022]. Jimenez et al. and Arora et al. present comprehensive reviews of such approaches. However, the concepts of XXXX among other concepts described herein

8. Conclusions

In this work, we presented an approach for learning a probabilistic model of an agent using interactive querying. We showed that the approach is few-shot generalizable to larger environments and learns a sound and complete model faster than state-of-the-art approaches in a sample-efficient manner.

QACE describes the capabilities of the robot in terms of predicates that the user understands (this includes novice users as well as more advanced users like engineers). Understanding the limits of the capabilities of the robot can help with the safe usage of the robot, and allow better utilization of the capabilities of the robot. Indirectly, this can reduce costs since the robot manufacturer need not consider all possible environments that the robot may possibly operate in. The use of our system can also be extended to formal verification of SDMAs.

QACE can also be used by standard explanation generators as they need an agent's model. Such models are hard to obtain (as we also illustrate in this paper) and our approach can be used to compile them when they are not available to start with.

Additional Possible Concepts. In this work, we assume that the agent can be connected to a simulator to answer the queries. In some real-world settings, this assumption may be limiting as users might not have direct access to such a simulator. Formalizing the conditions under which is it safe to ask the queries directly to the agent in the real-world is a promising direction for the future work. Additionally, in this work, we assume the availability of the instruction set of the SDMA as input in the form of capability names. In certain settings, it might be useful to discover the capabilities of an evolving SDMA using methods proposed by Nayyar et al. and Verma et al. [2022].

APPENDIX A—SDM Setups and Additional Information

We used five SDM setups for our experiments, and Table 2 shows their size in terms of number of predicates and capabilities. Description for the cafe server robot is available in Sec. 6. Short descriptions of the other four SDM settings are presented below.

TABLE 2

| Size of the SDM setups in terms of number of predicates and capabilities. | | |
|---|---|---|
| SDM Setup | $|P|$ | $|C_N|$ |
| Cafe Server Robot | 5 | 4 |
| Warehouse Robot | 8 | 4 |
| Driver Agent | 4 | 2 |
| First Responder Robot | 13 | 10 |
| Elevator Control Agent | 12 | 10 |

Warehouse Robot. This SDM setup is implemented using the SOTA stochastic planning system used in the planning literature. This is motivated from Exploding Blocksworld setup introduced in the probabilistic track of International Planning Competition (IPC) 2004 [Younes et al., 2005]. It features a robot that has four capabilities: stack, unstack, pick, and place. stack capability stacks one object on top of another, unstack capability removes an object from top of another object, pick capability picks up an object from a fixed location, and place capability places the object at a fixed location. The setup is non-deterministic as executing some of these capabilities can destroy the object as they might be delicate. Hence even the ground truth does not have 100% success rate in this setup.

Driver Agent. This SDM setup is implemented using the SOTA stochastic planning system used in the planning literature. This is motivated from Tireworld setup introduced in the probabilistic track of IPC 2004 [Younes et al., 2005]. It consists of a robot moving around multiple locations. The move-vehicle capability that takes the SDMA from one location to another can also cause it to get a flat-tire with some non-zero probability. Not all locations have the option to change tire, but if available, a change-tire capability will fix the flat-tire with a 100% probability.

First Responder Robot. This SDM setup is inspired from First Responders in uncertainty track of IPC 2008 [Bryce and Buffet, 2008]. The setup features two kinds of emergencies: fire and medical, involving hurt victims. Victims can be treated at the site of an emergency or the hospital. This was originally a FOND setup, and we added probabilities to all the capabilities with non-deterministic effects to make it probabilistic. The responder vehicles can also be driven from one place to another and can be loaded and unloaded with fire or medical kits. The recovery status depending on the treatment location, is different with different probabilities.

Elevator Control Agent. This SDM setup is motivated from Elevators in the probabilistic track of IPC 2006 [Bonet and Givan, 2005]. It consists of an agent managing multiple elevators on multiple floors in a single building. The capabilities of moving from one elevator to another on the same floor are probabilistic. The size of this setup is much larger than the previous three. Also, the capabilities have arities of up to five, making this setup complex from an assessment point of view.

APPENDIX B—Extended Preliminaries

B.1 Fully Observable Non-Deterministic (FOND) Model

A fully-observable non-deterministic (FOND) planning model [Cimatti et al., 1998] can be viewed as a probabilistic planning model without the probabilities associated with each effect pair. On executing an action, one of its possible effects is chosen. The solution to these planning models is a partial policy $\Pi: S \rightarrow A$ that maps each state to an action that the agent should execute in that state. As shown by Cimatti et al. and Daniele et al. [1999], the solution is a (i) weak solution if the resulting plan may achieve the goal without any guarantee; (ii) strong solution if the resulting plan is guaranteed to reach the goal; and (iii) strong cyclic solution if the resulting plan is guaranteed to reach the goal under the assumption that in the limit, each action will lead to each of its effects.

FIG. 6 shows a sample FOND description of the pick-item capability (shown in FIG. 2). Note that there are no probabilities associated with each possible effect set, as the representation only shows that one of these possible set of effects is possible on executing this capability. Also, the language only supports the keyword action hence it is used for representing capability in the first line.

B.2 PPDDL

We use Probabilistic Planning Domain Definition Language (PPDDL) to represent the probabilistic models in our work. It has two main components: (i) a domain description, consisting of definitions of the actions that are possible along with their preconditions and effects (an example of action description is shown in FIG. 2); and (ii) a problem description representing all the objects in the environment, a fully defined initial state, and partial description of the goal state. Sample domain and problem descriptions for the driver agent are available below:

```
(define (domain driver-agent)
    (:requirements :typing :strips :probabilistic-effects)
    (:types location)
    (:predicates
        (vehicle-at ?1 - location)
        (spare-in ?1 - location)
        (road ?from - location ?to - location)
        (not-flattire))
(:action move-vehicle
    :parameters (?from - location ?to - location)
    :precondition (and (vehicle-at ?from) (road ?from ?to) (not-flattire))
    :effect (and (vehicle-at ?to) (not(vehicle-at ?from))
    (probabilistic 0.8 (and (not(not-fl attire))))))
(:action change-tire
    :parameters (?1 - location)
    :precondition (and (spare-in ?1) (vehicle-at ?1) (not(not-flattire)))
    :effect (and (not (spare-in ?1)) (not-flattire)))
)
(define (problem driver-agent-9)
    (:domain driver-agent)
    (:objects 1-1-1 1-1-2 1-1-3 1-2-1 1-2-2 1-3-1 - location)
    (:init
```

-continued

```
        (vehicle-at 1-1-1) (not-flattire) (spare-in 1-2-1) (spare-in 1-2-2)
        (spare-in 1-3-1) (road 1-1-1 1-1-2) (road 1-1-2 1-1-3)
        (road 1-1-1   1-2-1) (road 1-1-2   1-2-2) (road 1-2-1   1-1-2)
        (road 1-2-2   1-1-3) (road 1-2-1   1-3-1) (road 1-3-1   1-2-2)
    )
    (:goal (and (vehicle-at 1-1-3)))
)
```

APPENDIX C—Additional Details

C.1 Instantiated Predicates

A literal corresponding to a predicate $p \in P$ can appear in pre(c) or any $e_i(c) \in$ eff(c) of a capability $c \in C$ iff it can be instantiated using a subset of parameters of c. E.g., consider a capability move-vehicle (?src ?dest) and a predicate (connected ?x ?y) in the example discussed earlier. Suppose a literal corresponding to the predicate (connected ?x ?y) can appear in the precondition and/or the effect of move-vehicle (?src ?dest). The possible lifted instantiations of predicate connected compatible with move-vehicle are (connected ?src ?dest), (connected ?dest ?src), (connected ?src ?src), and (connected ?dest ?dest). The number of parameters in a predicate $p \in P$ that is relevant to a capability $c \in C$, i.e., instantiated using a subset of parameters of c, is bounded by the maximum arity of c. So using the capability names and the predicates, we get a set of instantiated predicates. In our implementation we use these set of instantiated predicates as the set of predicates.

C.2 Abstraction Example

Figure 7:
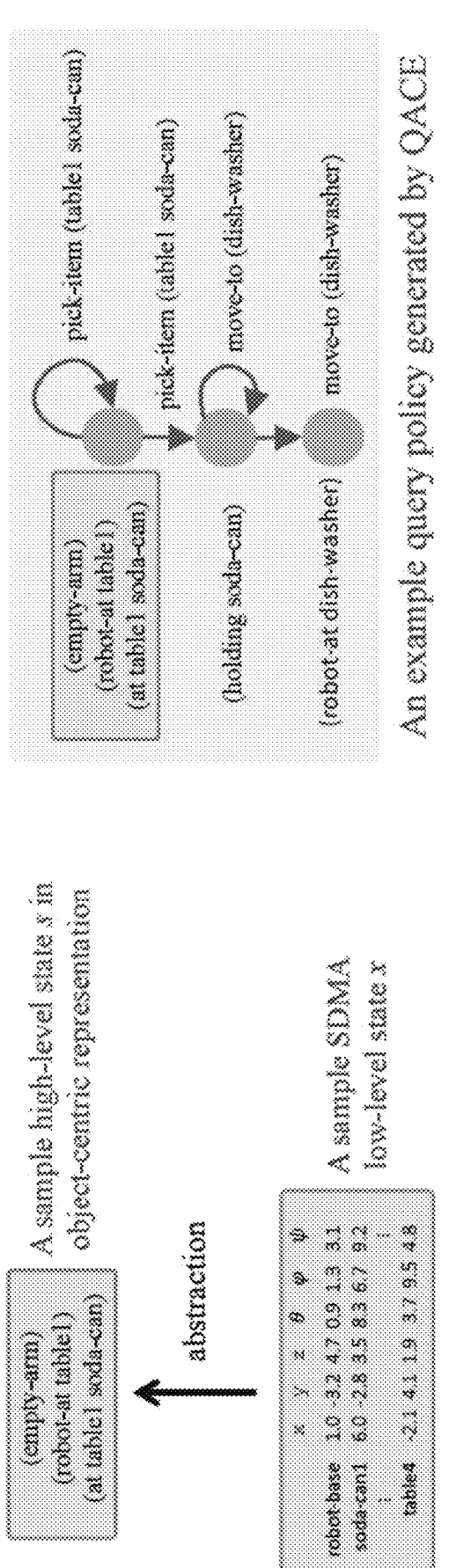
FIG. 7 is an illustration of an example of abstraction of low-level state into a high level state (left) and an example of a policy simulation query (right).

FIG. 7 (left) shows an example from the cafe server SDM setting, where a concrete low-level state is represented as xyz-coordinates, roll, pitch, and yaw values by the simulator. This state is then converted to a high-level state shown in the figure. We use the Boolean evaluation functions for evaluating each predicate. The state is represented as conjunction of the true predicates.

Example of Policy Simulation Query

FIG. 7 (right) shows an example of a policy simulation query. Note that the initial state is shown adjacent to the top-most node. A partial policy is a mapping from a partial state to a capability. Such queries can be generated using non-deterministic planners like PRP [Muise et al., 2012].

Generating Policy Simulation Queries using PRP. QACE automates the generation of queries using FOND planning problems. QACE always generates queries to distinguish between models that differ only on one predicate corresponding to just one location (a precondition or effect in a capability). The main idea behind generating such queries is that the responses to the query q from the two models should be logically inconsistent. To generate the policy simulation queries, QACE creates a FOND planning model and a problem.

Let $M_i$ and $M_j$ be a pair of FOND models expressed using P and C where $i, j \in \{T, F, I\}$. QACE renames the predicates and capabilities in $M_i$ and $M_j$ as $P_i$ and $P_j$, and $C_i$ and $C_j$, respectively, so that there are no intersections and a pair of states in the two models can be progressed independently using pairs of capabilities. This gives a planning model $M_{ij} = \langle P_{ij}, C_{ij} \rangle$. Here, $P_{ij} = P_i \cup P_j \cup \{(\text{goal})\}$, where (goal) is a 0-ary predicate. It is used to identify when the goal for the FOND planning problem is reached. For each capability $\langle c_i, c_j \langle \in \rangle C_i, C_j \rangle$ such that their names match, pre($c_{ij}$) of the combined capability cy is disjunction of preconditions of $c_i$ and $c_j$. For $e(c_{ij}) \in$ eff($c_{ij}$) ACE adds three conditional effects: (i) pre($c_i$) $\wedge e(c_j) \Rightarrow e(c_i) \wedge$ pre($c_j$); (ii) pre($c_i$) $\wedge \neg$ pre($c_j$) $\Rightarrow$ (goal); and (iii)$\neg\mathrm{pre}(c_i)\wedge\mathrm{pre}(c_j)\Rightarrow$(goal). An example of this process is included in the next section.

Starting from an initial state, the FOND problem uses one of these states and maintains two different copies of all the objects in the environment, one corresponding to each of the models. Each model only manipulates the objects in its own copy. QACE then solves a planning problem that has an initial state $S_{I_{ij}}=\{P_i^{*1}, \ldots, P_i^{*z}, P_j^{*1}, \ldots, P_j^{*z}\}$ and a goal state $G_{ij}=$(goal)$\vee[\exists p\in P^*_{ij}(p_i\wedge\neg p_j)\vee(\neg p_i\wedge p_j)]$. Here, $P^*$ represents the grounded version of predicates P using objects O in the environment. The partial policy generated as a solution to this planning problem is a strong solution. As shown by Cimatti et al. [1998], the solution is a strong solution if the resulting plan is guaranteed to reach the goal. The solution partial policy will lead the two models in a state where at least one capability cannot be applied, and hence the (goal) predicate becomes true. This is possible because the models differ only in the way one predicate is added at a location. We formalize this with the following lemma. The proof is available in Appendix D.

Lemma 1. Given two models $M_i$ and $M_j$ such that both are abstractions of the same FOND model, and are at the same level of abstraction with only one predicate differing in way it is added in one of the location, the intermediate FOND planning problem created using QACE to generate policy simulation queries has a strong solution.

We next present an example of a sample planning domain and problem using which QACE generates a query. Recall that a FOND planning problem consists of two components, a planning domain and a planning problem. We will see an example of both below.

FOND planning domain. Consider we have a capability move-vehicle (?frm ?to) in the Cafe server robot, and we already know one of its preconditions; (has-charge). We are now trying to find what will be the correct way to add the predicate (robot-at ?frm) in the precondition of this move-vehicle (?frm ?to) capability. Consider we have two models $M_i$ and $M_j$, where i=T and j=F. We will represent their move-vehicle capability as follows:

```
(:action move-vehicle_i
    :parameters (?frm - loc ?to - loc)
    :precondition (and (has-charge_i)
        (robot-at_i ?frm))
    :effect (and ))
(:action move-vehicle_j
    :parameters (?frm - loc ?to - loc)
    :precondition (and (has-charge_j)
        (not (robot-at_i ?frm)))
    :effect (and))
```

To create a query, we will combine the move-vehicle capabilities into a combined capability. This should be done in such a way that the combined capability is executed when at least one of the model's preconditions are satisfied. Hence, for each capability $\langle c_i, c_j\rangle\in\langle C_i, C_j\rangle$ s. t. name$(c_i)$=name$(c_j)$, pre$(c_{ij})$=pre$(c_i)\vee$pre$(c_j)$.

Now on executing this combined capability, we should be able to identify if the preconditions or effects of the capabilities in the two models $M_i$ and $M_j$ are different. To take these into account, the effect of the combined capability will be such that for each e$(c_{ij})\in$eff$(c_{ij})$ we add three conditional effects: (i) pre$(c_i)\wedge$pre$(c_j)\Rightarrow$e$(c_i)\wedge$e$(c_j)$; (ii) pre$(c_i)\wedge\neg$pre $(c_j)\Rightarrow$(goal) and (iii) pre$(c_i)\neg$pre$(c_j)\Rightarrow$(goal). The condition (ii) and (iii) helps identify that the precondition of the capability according to only one of the models $M_i$ or $M_j$ is satisfied. The condition (i) captures the case where the precondition of the capability according to both the models are satisfied. In this case, the effects of the capability according to both the models are applied.

Applying it for the move-vehicle capability, we get:

```
(:action move-vehicle_ij
    :parameters (?frm - loc ?to - loc)
    :precondition (or
        (and (has-charge_i)
            (robot-at_i ?frm))
        (and (has-charge_j)
            (not (robot-at_j ?frm)))
    )
    :effect (and
        (when (and (has-charge_i)
            (robot-at_i ?frm)
            (has-charge_j)
            (not (robot-at j ?frm)))
            (and )
        )
        (when (and (has-charge_i)
            (robot-at_i ?frm)
            (or (not (has-charge_j))
                (robot-at_j ?frm)))
            (and (goal))
        )
        (when (and (has-charge_j)
            (not (robot-at_j ?frm))
            (or (not (has-charge_i))
                (not (robot-at_i ?frm))))
            (and (goal))
        )
    )
)
```

Figure 8:
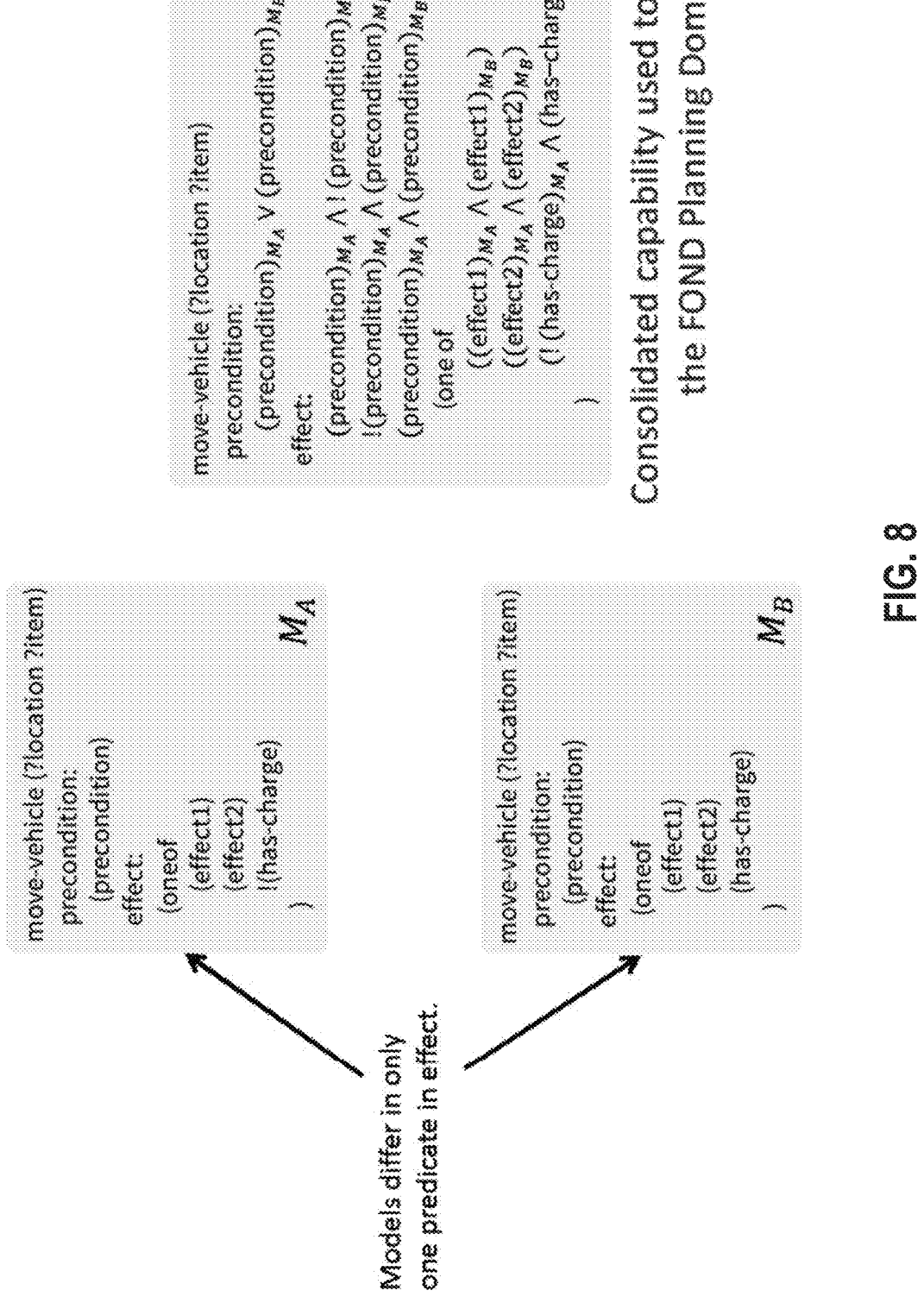
FIG. 8 is an illustration of an example showing how two models $M_i$ and $M_j$ are combined to generate a FOND planning domain when the predicate is being added in effect of a capability (note that the models only differ in one predicate having different form in both models).

Note that we have expanded pre$(c_i)\wedge\neg$pre$(c_j)$ using disjunction of negations of all predicates in pre$(c_j)$, etc. A pictorial example of a similar process for the has-charge predicate in effects is shown in FIG. 8.

FOND planning problem. The FOND planner must maintain two different copies of all the objects in the environment, one corresponding to each of the models $M_i$ and $M_j$. Each model only manipulates the objects in its own copy. The initial state of this planning problem $s_1$ is $\{P_i^1, \ldots, P_i^z, P_j^1, \ldots, P_j^z\}$. The goal formula G is (goal)$\vee[\exists p\in P(p_i\wedge\neg p_j)\vee(\neg p_i\wedge p_j)]$. Here (goal) becomes true when a capability is executed by the policy such that the precondition of that capability is satisfied according to only one of the two models. The other condition captures the fact that a state is reached such that at least one of the predicate is true according to one of the models and false according to the other. This points to a difference in the effects of the capability that was executed last.

C.4 Identifiable Effects

A set of effects of a capability are identifiable if there exists a state such that when we execute a capability in that state, we can identify which of its effects was executed. Let us consider a capability a, such that pre$(a)=\{p_1\wedge p_2\wedge\neg p_3\}$ and eff$(a)=\{\langle p_3\wedge p_4, 0.2\rangle, \langle p_3\wedge\neg p_2, 0.5\rangle, \langle p_3\wedge\neg p_4\wedge\neg p_2, 0.3\rangle\}$. The effects of this capability are identifiable because if we execute this capability in state $\langle p_1, p_2, p_4\rangle$, we can identify which of its effect is getting executed. This is because, on executing a, we can identify each effect as follows: (i) if the resulting state has $p_4$ and $p_2$ then it is the first effect, (ii) if the resulting state has $p_4$ but not $p_2$, then it is the second effect, and (iii) if the resulting has neither $p_2$ nor $p_4$, then it is the third effect.

With all these concepts in place, we next see how one loop of the Alg. 1 is run.

C. 5 Example Run of the Algorithm

Consider that the set of predicates consists of (has-charge) and (robot-at ?frm), and move-vehicle is one of the capability. Consider that we are starting with an empty model in line 2 of Alg. 1. Now consider that the actual precondition of the move-vehicle capability is (has-charge) A (robot-at ?frm). The automated query generation process will involve executing the capability successfully in some state s by the policy. The SDMA can only execute the capability in s if (has-charge) A (robot-at ?frm) is true in s. As mentioned in Sec. 4.3, if s doesn't fulfill this criterion (i.e., the SDMA fails to execute the policy successfully) a new query is generated from a new initial state s'. Hence, this property of executing the capability in a state having (has-charge) A (robot-at ?frm) is ensured. Now, when reasoning about (has-charge), the policy can ask the agent to execute that capability in the state s \ (has-charge) and if the SDMA fails to execute it then it means (has-charge) is part of the precondition. Similarly, this can be done for (robot-at ?frm) independently.

In the worst case, the search for a state s where a query policy is executable will be exponential, but as the evaluations show, we can learn the correct model much faster. We also mention a way to overcome this in Sec. 4.3. Please note that even for methods like reinforcement learning, the worst-case upper bound is exponential in terms of the state space.

Possible models and their pruning. Now we see how QACE learns a correct model once it finds a state s where a capability is executable by the agent. Consider that QACE is processing the tuple $\langle l, p \rangle = \langle$ precondition of move–vehicle, (has–charge)$\rangle$ in line 3 of Alg. 1.

Now, QACE will generate the three models in line 4: (i) MT that has (has-charge) as precondition of move-vehicle capability; (ii) $M_F$ that has $\neg$ (has-charge) as precondition of move-vehicle capability; and (iii) M, that has an empty precondition for move-vehicle capability.

Consider that QACE is considering the pair $\langle M_T, M_F \rangle$ in line 5 of Alg. 1. In the example being considered, executing the move-vehicle capability in the state s can help QACE distinguish between $M_T$ and $M_F$. Here the model $M_F$ will be unable to execute the move-vehicle capability in s, whereas the model $M_T$ and the agent will be able to. So QACE will prune $M_F$ in line 8.

Next, QACE will consider the pair $\langle M_T, M_I \rangle$ in line 5 of Alg. 1. Here, to distinguish between these model, QACE will execute the move-vehicle capability in a state s' where (has-charge) is false. Note that this state is also not generated manually, and the query generation does this autonomously, starting from the state s. Here the model $M_T$ and the agent will fail to execute the capability, whereas the model M, will succeed. Hence QACE can prune out $M_I$, leading it to learn the correct model M*=$M_T$ where (has-charge) is a precondition of the move-vehicle capability.

Now starting with this updated current partial model M*, consider that QACE picks the tuple $\langle l, p \rangle = \langle$ precondition of move–vehicle, (robot–at ? frm)$\rangle$ in line 3 of Alg. 1. QACE will then generate three new models in next iteration in line 4: (i) $M_T$ that has (has-charge)$\land$(robot-at ?frm) as precondition of move-vehicle capability; (ii) $M_F$ that has (has-charge) A–, (robot-at ?frm) as precondition of move-vehicle capability; and (iii) M, that has (has-charge) as precondition of move-vehicle capability. So essentially, QACE builds upon the already learned partial model M* in previous iterations, and continues refining the model to eventually end up with the correct FOND model.

Once the correct set of preconditions and effects are learned, QACE counts the number of times each effect set was observed on executing each capability and perform the maximum likelihood estimation for each effect set to calculate the probabilities for each effect set. Note that a capability c will at least appear in policies for all $\langle$ l, p$\rangle$ pairs, such that location I corresponds to a precondition or effect in c. So effectively, a capability c can appear in at least 2×|P| queries. So we will have at least 2×|P|×η samples for each capability.

APPENDIX D. Theoretical Results

This section provides proofs for the two theorems mentioned in the main paper. We will first show that the plan in the distinguishing queries always ends up with the capability that is part of the pal tuple being concretized at that time. This will help us in limiting our analysis to, at most, the last 2 capabilities in the plan.

Proposition 1. Let $M_i$, $M_j$, where i, j$\in\{$T, F, I$\}$, be the two models generated by adding a predicate p in a location corresponding to a capability c to a model M. Suppose q= $\langle S_I, \pi, G, \alpha, \eta \rangle$ is a distinguishing query for two distinct models $M_i$, $M_j$. The last capability in the partial policy $\pi$ to achieve G will be c.

Proof. We prove this by contradiction. Consider that the last capability of the policy $\pi$ in the distinguishing query q is c'≠c. Now the query q used to distinguish between $M_i$ and $M_j$ is generated using the FOND planning problem $\langle M_{ij}, S_{I_{ij}}, G_{ij} \rangle$, which has a solution if both the models have different precondition or at least one different effect for the same capability. Since the last capability of the policy is c', the two models either have different preconditions for c' or different effects. This is not possible as, according to Alg. 1, $M_i$ and $M_j$ differ only in precondition or effect of one capability c. Hence c'=c.

We now use this proposition to prove Lemma 1 stated in Appendix C.3.

Lemma 1. Given two models $M_i$ and $M_j$ such that both are abstractions of the same FOND model, and are at the same level of abstraction with only one predicate differing in way it is added in one of the location, the intermediate FOND planning problem created using QACE to generate policy simulation queries has a strong solution.

Proof (Sketch). We prove this in two parts. In the first part, we consider the case where we are refining the model in terms of the precondition of some capability. Recall that for each capability $c_{ij}$, we have 3 conditional effects: i) pre($c_i$)$\land$pre($c_j$)$\Rightarrow$e($c_i$)$\land$e($c_j$); (ii) pre($c_i$)$\land\neg$pre($c_j$)$\Rightarrow$ (goal); and (iii) $\neg$pre($c_i$)$\land$pre($c_j$)$\Rightarrow$(goal). Now, according to proposition 1, capability ($c_{ij}$) has to be the last capability in the policy $\pi$. Since the model $M_i$ and $M_j$ differ only in preconditions, condition (ii) or (iii) must be true for $c_{ij}$. This implies that on executing $c_{ij}$, the (goal) predicate will become true, and executing this policy $\pi$ will end up in reaching the goal.

In the second part, we consider the case where we are refining the model in terms of the effects of some capability. According to proposition 1, capability $c_{ij}$ has to be the last capability in the policy $\pi$. Since the model $M_i$ and $M_j$ differ only in effects, condition (i) must be true for cu. This implies that on executing $c_{ij}$, one of the predicates will become true according to one model, and false according to another, and hence executing this policy $\pi$ will end up in reaching the goal condition $G_{ij}$.

Next, we prove the soundness and completeness of the learned model w.r.t. the agent model. Note that an important part of the process is to get a state s, where a capability c can be executed successfully. We can collect this information using some random traces, using a state where all capabilities are applicable, or asking the agent for a state where certain conditions are met ($Q_{SR}$). We use this information in the proof.

Theorem 1. Let A be a black-box SDMA with a ground truth transition model T' expressible in terms of predicates P and a set of capabilities C. Let M* be the non-deterministic model expressed in terms of predicates P* and capabilities C, and learned using the query-based autonomous capability estimation algorithm (Alg. 1) just before line 10. Let $C_N$ be a set of capability names corresponding to capabilities C. If P*⊆P, then the model M* is sound w.r.t. the SDMA transition model T'. Additionally, if P*=P, then the model M* is complete w.r.t. the SDMA transition model T'.

Proof. We first prove that given the predicates P, capability names $C_H$, model of the agent T', and the model M* learned by Alg. 1, M is sound w.r.t. the model T'. We do this in two cases. The first one showing that the learned preconditions of all the capabilities in M* are sound, and the second one showing the same thing for learned effects. We use $M_T$, $M_F$, and $M_I$ to refer to models corresponding to adding p (true), not(p) (false), and not adding p (ignored), respectively to model M*.

Case 1: Consider the location is precondition in a capability c where we are trying to find the correct way to add a predicate p∈P.

Case 1.1: Let the models we are comparing be $M_T$ and $M_I$ (or $M_F$). The policy simulation query q to distinguish between these models would involve executing c in a state where p is false. Now, $M_T$ would fail to execute c (as it has p as a positive precondition), and $M_I$ (or $M_F$) would successfully execute it. If A can execute c in such a state, we can filter out the model $M_T$. We can also remove p from a state where A is known to execute c, and see if it can execute c If not, we can filter out the model $M_I$ (or $M_T$).

Case 1.2: Let the models we are comparing be $M_F$ and $M_I$. The policy simulation query q to distinguish between these models would involve executing c in a state where p is true. $M_F$ would fail to execute c as it has p as a negative precondition, whereas $M_I$ would successfully execute it. If A can execute c in such a state, we can filter out the model $M_T$. We can also add p to a state where A is known to execute c, and see if it can execute c If not, we can filter out the model $M_I$.

Case 2: Consider the location is effect in a capability c where we are trying to find the correct way to add a predicate p∈P*.

Case 2.1: Let the models we are comparing be $M_T$ and $M_I$ (or $M_F$). The policy simulation query q used to distinguish between these models would involve executing c in a state where p is false. After executing it, the resulting state will have p true according to $M_T$ only. We ask the agent to simulate the policy N times, with p as the goal formula G. If p appears in any of the simulation after executing c, then we learn all the possible effects involving p Not that the capability has identifiable effects, so if p appears in more than one effect, the corresponding effect will eventually be discovered when concretizing the predicate that uniquely identifies that effect.

Case 2.2: Let the models we are comparing be $M_F$ and $M_I$. The policy simulation query q used to distinguish between these models would involve executing c in a state where p is true. After executing it, the resulting state will have p true according to $M_I$ only. We ask the agent to simulate the policy n times, with p as the goal formula G. If p appears in any of the runs, then we learn all the possible effects involving p Not that the capability has identifiable effects, so if p appears in more than one effect, the corresponding effect will eventually be discovered when concretizing the predicate that uniquely identifies that effect.

Combining both cases, we infer that whenever we learn a precondition or effect, it is added in the same form as in the ground truth model T', hence the learned model M* is sound w.r.t. T'.

We now prove that given the predicates P, capability names $C_H$, model of the agent T', and the model M* learned by Alg. 1, M* is complete w.r.t. the model T'. We just showed that the model that we learn is sound as whenever we add a predicate in a precondition or effect, it is in correct mode. Now, since Alg. 1 loops over all possible combinations of predicates and capabilities, for both precondition and effect, we will learn all the preconditions and effects correctly. Hence, the learned model will be complete w.r.t. the agent model.

Theorem 2. Let A be a black-box SDMA with a ground truth transition model T' expressible in terms of predicates P and a set of capabilities C. Let M be the probabilistic model expressed in terms of predicates P* and capabilities C, and learned using the query-based autonomous capability estimation algorithm (Alg. 1). Let P=P* and M be generated using a sound and complete non-deterministic model M* in line 11 of Alg. 1, and let all effects of each capability c∈C be identifiable. The model M is correct w.r.t. the model T' in the limit as η tends to ∞, where η is hyperparameter in query $Q_{PS}$ used in Alg. 1.

Proof (Sketch). Thm. 1 showed that the model learned by Alg. 1 is sound and complete, meaning all the preconditions and effects are correctly learned. Consider that each sample generated by asking an agent to follow a policy is i.i.d. Now, if we consider only the samples in which a capability is applied in a state such that its effects are identifiable effects, then we can use MLE to learn the correct probabilities given infinite such samples. This is a direct consequence of the result that given infinite i.i.d. samples, probabilities learned by maximum likelihood estimation converge to the true probabilities [Kiefer and Wolfowitz, 1956].

APPENDIX E—Extended Empirical Evaluation

Figure 9:
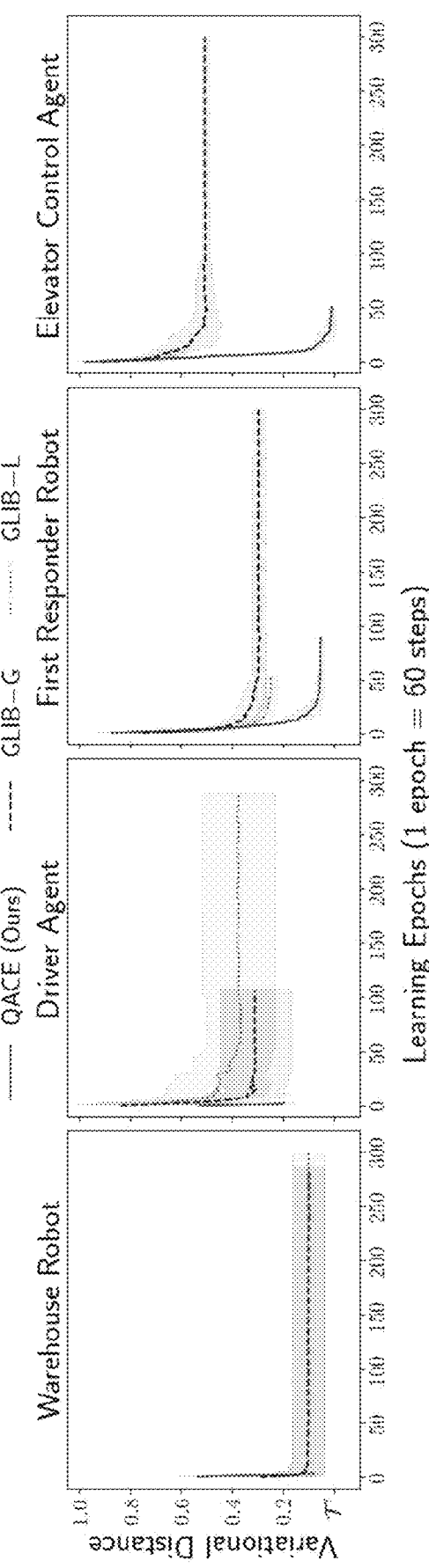
FIG. 9 is a series of graphs showing results of trends in the approximate Variational Distance described herein with reference to the total number of steps in the environment (lower values better) for the three methods: QACE, GLIB-G, and GLIB-L. Lines which do not extend until the end indicate that the time limit (4 hours) was exceeded. The results were calculated using 30 runs per method per domain. Solid lines are averages across runs and shaded portions show the standard deviation with T' being the ground truth model.
Figure 10:
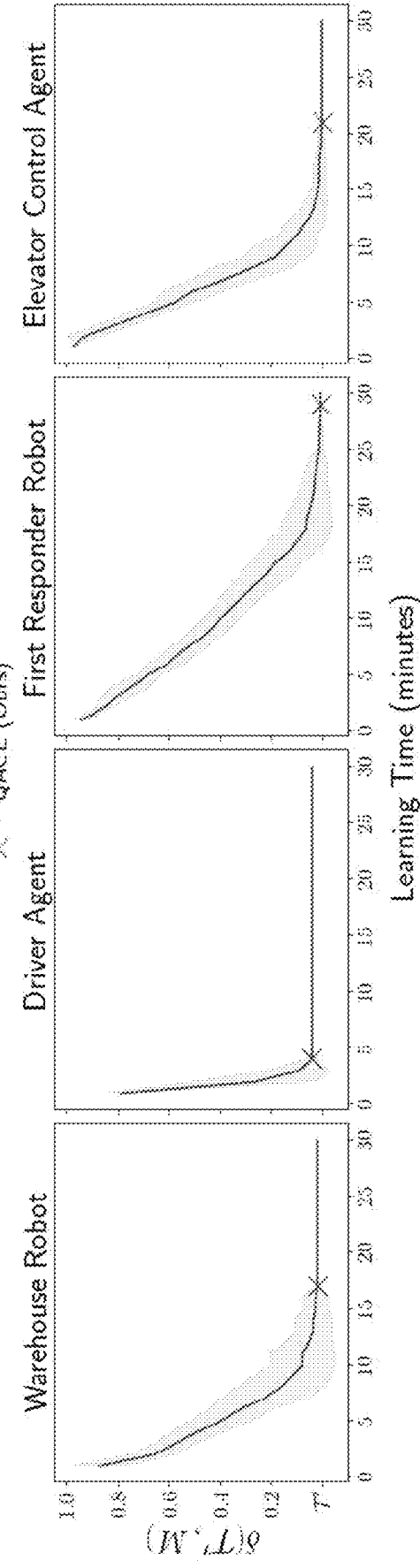
FIG. 10 is a series of graphs showing results of the comparison of QACE with reference to the ground truth model T'—the plots show a trend in the variational distance (see Eq. 1) as a factor of the learning time for QACE (lower values better); x shows that the learning process ended at that time instance for QACE; the results were calculated using 30 runs per method per domain; solid lines are averages across runs, and shaded portions show the standard deviations.

Referring to FIGS. 9-10, as mentioned earlier, we used a single, small training problem with few objects (≤7). To demonstrate generalizability, our test set contained problems that had twice the number of objects than the training problem. Increasing the number of objects causes an exponential increase in the problem size in terms of the state space.

For all the experiments, for each run of the experiment, we run QACE as well as the baselines from scratch. For the plots, we took snapshot of the learned models every 60 seconds and computed the variational distance using a fixed test dataset.

In addition to the experiments described in the main paper, we also performed some additional experiments. These are explained and discussed below.

Results w.r.t. environment steps. FIG. 9 show a comparison of the approximate variational distance between QACE and the baselines as a factor of the total steps taken in the environment. From the results, it is clear that QACE is able to outperform GLIB while taking far fewer steps in the environment. GLIB-L operates by babbling lifted goals and we found that the goal babbling step of GLIB-L took an inordinate amount of time leading to very few steps in the environment before the timeout of 4 hours. GLIB-G babbles grounded goals and thus can perform many steps but is not sample efficient in learning as the results show. We analyzed the cause and found that if GLIB-G learns an incorrect model, it is often quite difficult to get out of local minima since it keeps generating and following the same plan.

Evaluation w.r.t. ground truth models T' FIG. 10 demonstrate that QACE is able to converge to a learned model that is near-perfect compared to the ground truth model T'. QACE is able to learn such a near-perfect model in a fraction of the time compared to the baselines (see FIG. 5 in the main paper). QACE can learn the non-deterministic effects and preconditions in a finite number of representative environment interactions and given enough samples MLE estimates are guaranteed to converge. This is in stark contrast to GLIB whose learned NDRs cannot be easily compared to the ground truth.

Figure 11:
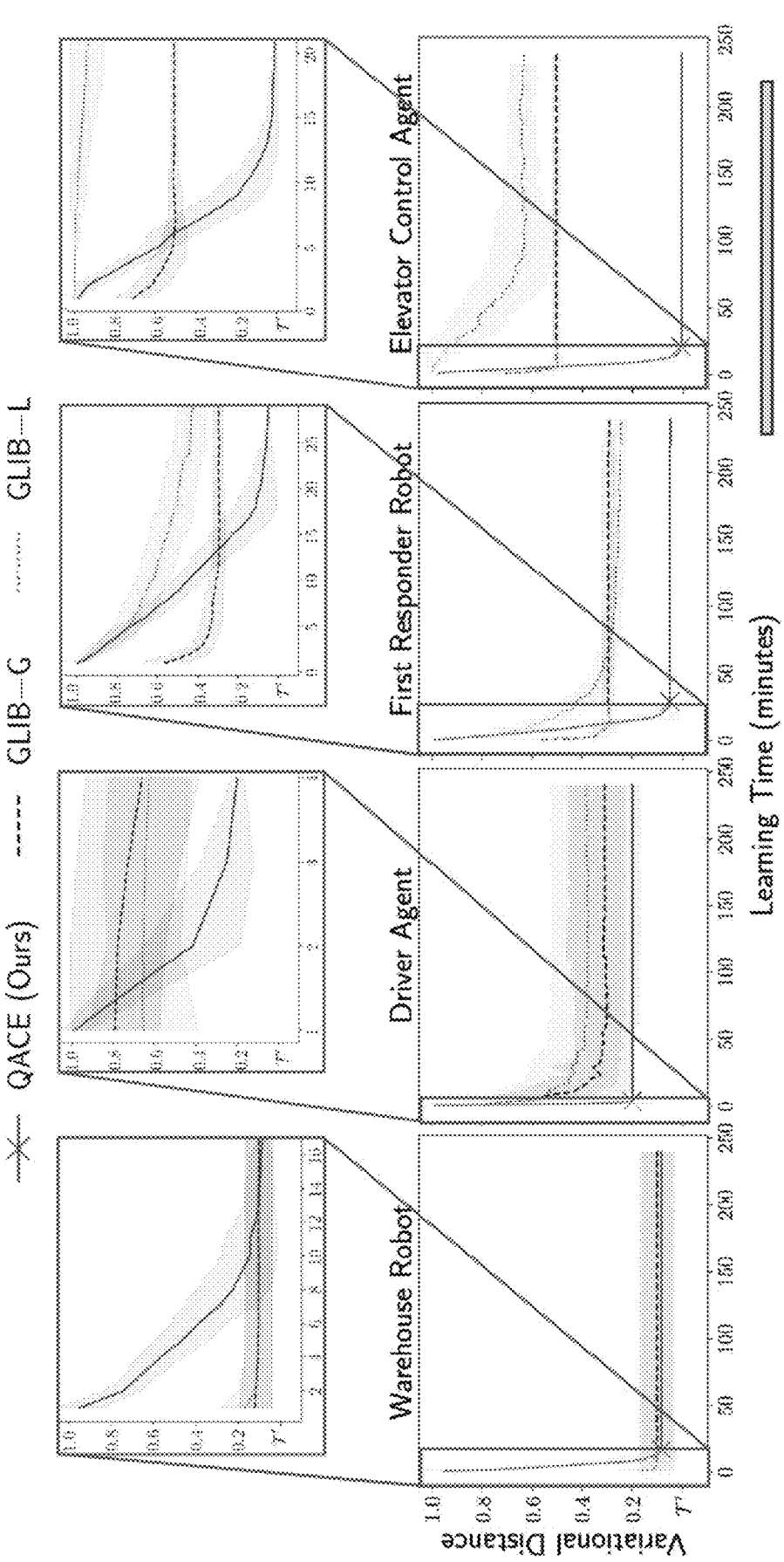
FIG. 11 is a series of graphs showing results of the comparison of QACE with reference to the ground truth model T'—the plots. The plots show a trend in the variational distance (see Eq. 1) as a factor of the learning time for QACE (lower values better). X shows the learning process ended at that time instance for QACE. The results were calculated using 30 runs per method per domain. Solid lines are averages across runs, and shaded portions show the standard deviation. The zoomed in versions shows the plots till learning process for QACE ends (marked using x in the zoomed-out plots). Note that QACE does not run beyond this.

Faster convergence. FIG. 11 shows a zoomed in version of the FIG. 5 in the main paper. As you notice in the graph, the variational distance is very high initially, and it drops till the learning process of QACE ends (marked by x on the plots). We do not need to run QACE beyond this point and this time is short for all the domains. On the other hand, GLIB does not have a clear ending criterion. Hence we let it run for 4 hours and see that even with the extra time (and hence extra samples), it cannot learn a better model. The zoomed in plots also show that QACE does not learn the correct model in a one-shot manner, and that it actually keeps getting better with time as it processes more predicate and capability pairs.

Figure 12:
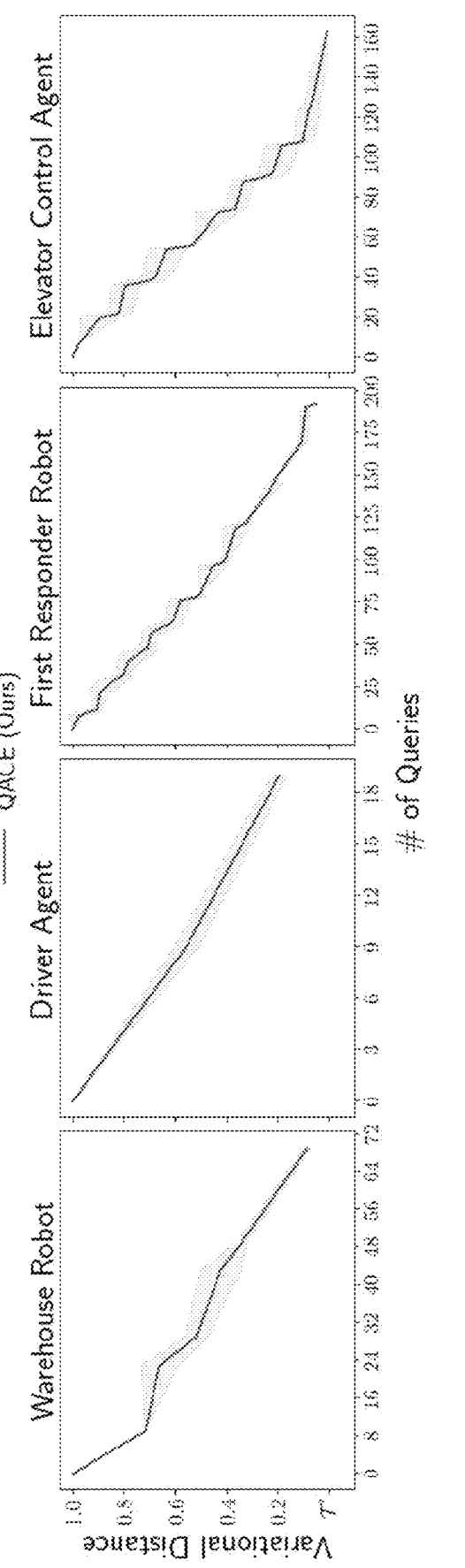
FIG. 12 is a series of graphs showing results of the average number of queries issued by QACE across 30 runs to achieve a specific variational distance (VD). Shaded regions represent one std. deviation. A VD of 0 (zero) corresponds to the ground truth model T'.

Scalability. The number of queries needed to learn the model are linear in terms of the number of predicates and capabilities (for loop in line 3 of Alg. 1). The total number of queries for each domain shown in FIG. 12 also correlates with the size of the domain shown in Tab. 1, supporting this hypothesis. Note that the for loop in line 5 of Alg. 1 only contributes to a constant factor in the running time, as only three models are possible when adding a predicate at a location.

Example Computer—Implemented System

Figure 13:
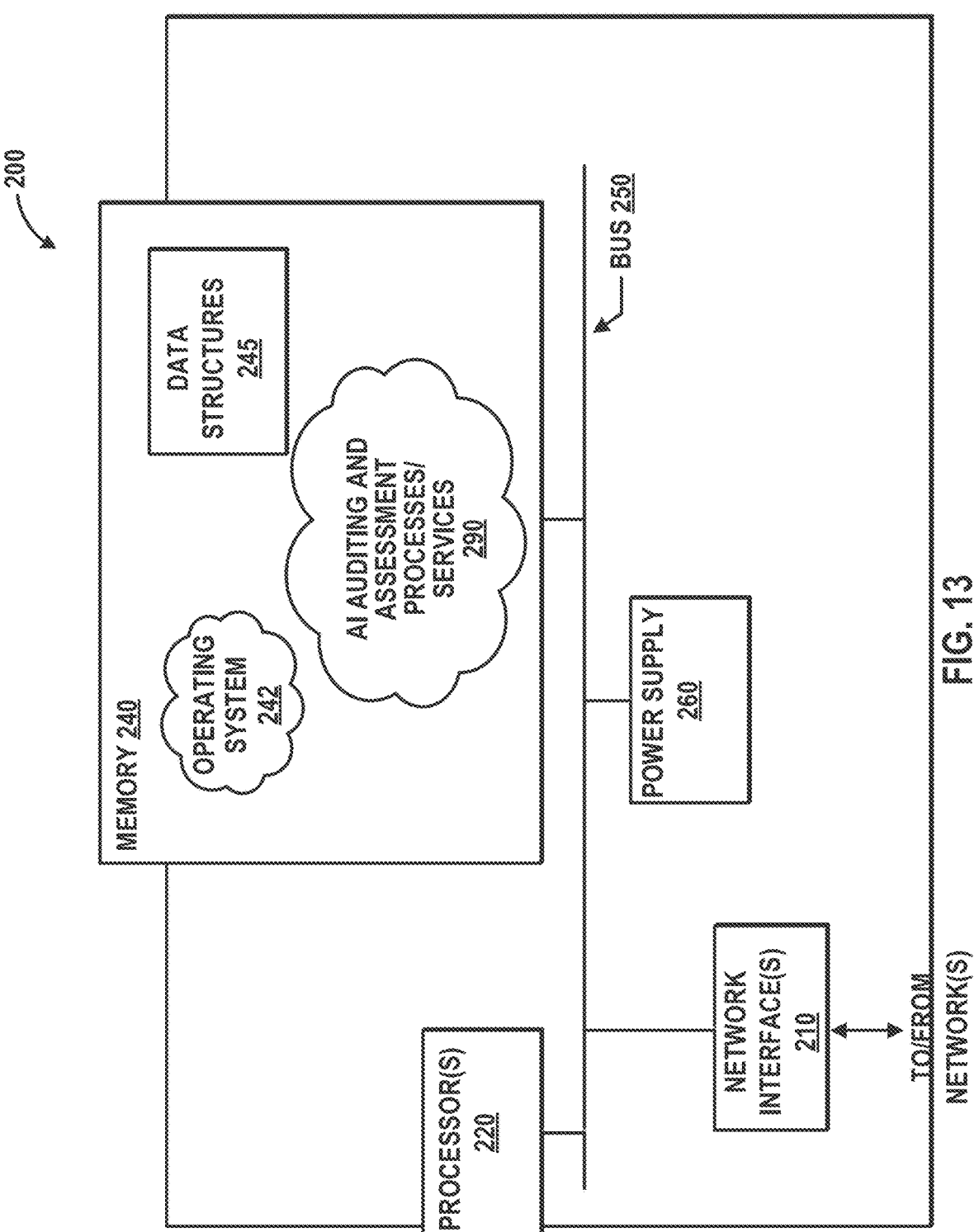
FIG. 13 is a simplified diagram showing an example computing system for implementation of the framework of FIG. 1A and/or other concepts described herein.

FIG. 13 is a schematic block diagram of an example device 200 that may be used with one or more embodiments described herein, e.g., as a component of framework 100 shown in FIG. 1A.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches).

Memory 240 can include instructions executable by the processor 220 that, when executed by the processor 220, cause the processor 220 to implement aspects of the framework 100 and the methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include AI Auditing and Assessment processes/services 290, which can include aspects of the methods and/or implementations of various modules described herein. Note that while AI Auditing and Assessment processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the AI Auditing and Assessment processes/services 290 is shown as a standalone process, those skilled in the art will appreciate that this process may be executed as a routine or module within other processes.

Additional aspects of this disclosure are set out in the independent claims and preferred features are set out in the dependent claims. Features of one aspect may be applied to each aspect alone or in combination with other aspects. In addition, while certain operations in the claims are provided in a particular order, it is appreciated that such order is not required unless the context otherwise indicates.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for autonomous assessment of sequential decision-making systems in stochastic settings, comprising:

accessing an input A, that is the software and/or integrated hardware constituting an agent of a sequential decision making (SDM) system capable of sequential decision making, or planning, and a simulator Sim that the agent A can interact with to execute its behavior;

inducing a system that accepts users' specification of objectives and computes and executes the behavior necessary for achieving them, learning an output model defining capabilities of the SDM system using query-based autonomous capability estimation, including:

defining M as a set of capability models expressible in terms of the set of interpretable concepts or predicates known to the user, discovering and learning true capabilities of the agent A as a model in M in a manner that clarifies to the user the agent A's true capabilities and the effects of executing them, by posing queries to the agent of the SDM system by:

generating possible capability models for a specific predicate and location combination within M, utilizing a forward search to generate policy simulation queries for a randomly selected subset of the generated possible capability models, wherein the policy simulation queries output a policy to reach a state where the subset of generated possible capability models provide different responses from each other, and utilizing responses to the policy simulation queries as data to eliminate possible capability models inconsistent with A's true capabilities from the set of capability models M, wherein the output model as learned models the set of A's capabilities in stochastic settings.

2. The method of claim 1, further comprising measuring a variational distance between the model and a true transition model associated with the SDMA system to evaluate how close the output model is to the true transition model.

3. The method of claim 1, further comprising using object-centric predicate representation including an abstraction of environment states to high-level logical states expressible in predicate vocabulary to induce the set of transition models.

4. The method of claim 1, wherein the output model as learned is a probabilistic model expressed in terms of the set of predicates and the set of capabilities.

5. The method of claim 1, wherein the output model as learned is a non-deterministic model expressed in terms of the set of predicates and the set of capabilities.

6. The method of claim 1, wherein the set of predicates are first order logic predicates and the evaluation functions include Boolean evaluation functions.

7. The method of claim 1, wherein the output model is learned using input concept vocabulary modeled as binary-valued predicates.

8. The method of claim 1, wherein the output model is learned by utilizing syntax and semantics of known SDM model representation language and probabilistic planning definition language.

* * * * *